United States Patent
Patel et al.

(10) Patent No.: US 11,071,162 B2
(45) Date of Patent: Jul. 20, 2021

(54) BROADCAST OR MULTICAST PHYSICAL LAYER CONFIGURATION AND CHANNEL STRUCTURE

(71) Applicant: QUALCOMM Incorporated, San Diego, CA (US)

(72) Inventors: Shimman Arvind Patel, San Diego, CA (US); Tingfang Ji, San Diego, CA (US); Naga Bhushan, San Diego, CA (US); Peter Gaal, San Diego, CA (US); John Edward Smee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 29 days.

(21) Appl. No.: 15/922,042

(22) Filed: Mar. 15, 2018

(65) Prior Publication Data
US 2018/0270893 A1   Sep. 20, 2018

Related U.S. Application Data

(60) Provisional application No. 62/474,038, filed on Mar. 20, 2017.

(51) Int. Cl.
*H04W 72/04* (2009.01)
*H04L 5/00* (2006.01)
(Continued)

(52) U.S. Cl.
CPC ......... *H04W 76/27* (2018.02); *H04W 72/005* (2013.01); *H04W 72/042* (2013.01);
(Continued)

(58) Field of Classification Search
CPC ........... H04W 72/0413; H04W 72/042; H04W 72/14; H04W 76/27; H04W 76/28;
(Continued)

(56) References Cited

U.S. PATENT DOCUMENTS 8,213,348 B2   7/2012  Ai
9,337,989 B2   5/2016  Li et al.
(Continued)

OTHER PUBLICATIONS

Huawei et al., "Scenario & Design Criteria on Flexible Numerologies", 3GPP TSG RAN WG 1 Meeting #84bis, R1-162156, Apr. 2, 2016, XP051080002, Retrieved from the Internet: URL:http://www.3gpp.org/ftp/tsg_ran/WG1_RL1/TSGR1_84b/Docs/, 7 pages.
(Continued)

*Primary Examiner* — Kevin C. Harper
*Assistant Examiner* — Derrick V Rose
(74) *Attorney, Agent, or Firm* — Shankar Krithivasan

(57) ABSTRACT

Methods, systems, and devices for wireless communication are described. Some wireless communications systems (e.g., New Radio (NR) systems) may support the dynamic configuration of time intervals (or slots) for communication in a specific link direction (e.g., uplink, downlink, sidelink, etc.). In such cases, a base station may dynamically allocate time intervals (or slots) for broadcast or multicast data (e.g., via a physical downlink control channel (PDCCH)) based on the dynamically determined configuration of certain time intervals (or slots). The dynamic allocation of resources for broadcast or multicast data may ensure that broadcast or multicast data is not scheduled to be transmitted during time intervals configured for uplink communication. In some cases, the broadcast or multicast data may be transmitted on a portion of a system bandwidth that is frequency division multiplexed with another portion of the system bandwidth allocated for mobile broadband (MBB) communications.

30 Claims, 18 Drawing Sheets

(51) Int. Cl.
  *H04L 1/00* (2006.01)
  *H04W 76/27* (2018.01)
  *H04W 72/14* (2009.01)
  *H04W 72/00* (2009.01)
  *H04W 76/28* (2018.01)
  *H04W 88/08* (2009.01)

(52) U.S. Cl.
  CPC ....... *H04W 72/0413* (2013.01); *H04W 72/14* (2013.01); *H04W 72/0446* (2013.01); *H04W 72/0453* (2013.01); *H04W 76/28* (2018.02); *H04W 88/08* (2013.01)

(58) Field of Classification Search
  CPC ............... H04W 88/08; H04W 72/005; H04W 72/0446; H04W 72/0453
  See application file for complete search history.

(56) References Cited

U.S. PATENT DOCUMENTS

| | | | |
|---|---|---|---|
| 9,591,615 | B2 | 3/2017 | Li et al. |
| 2003/0140304 | A1* | 7/2003 | Hurt ................. H03M 13/2764 714/786 |
| 2005/0147040 | A1* | 7/2005 | Vayanos ............... H04L 1/0057 370/235 |
| 2010/0296410 | A1* | 11/2010 | Kazmi .................. H04W 24/10 370/252 |
| 2011/0188441 | A1 | 8/2011 | Kim et al. |
| 2012/0195246 | A1* | 8/2012 | Papasakellariou ..... G06Q 20/10 370/311 |
| 2014/0161001 | A1 | 6/2014 | Gao et al. |
| 2015/0109990 | A1* | 4/2015 | Tong .................... H04B 7/0874 370/312 |
| 2016/0014781 | A1* | 1/2016 | Nagata .............. H04W 72/0453 370/329 |
| 2017/0171842 | A1* | 6/2017 | You ....................... H04L 5/0048 |
| 2018/0070341 | A1* | 3/2018 | Islam ................... H04L 1/1887 |

OTHER PUBLICATIONS

Intel Corporation: "Frame Structure Considerations for URLLC", 3GPP Draft; R1-167127, Intel URLLC Frame Structure V2, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125728, Retrieved from the Internet: URL:http://www.3gpp.org/ftp/Meetings_3GPP_SYNC/RAN1/Docs/ [retrieved on Aug. 21, 2016], 10 pages.

International Search Report and Written Opinion—PCT/US2018/022882—ISA/EPO—dated Jun. 5, 2018.

AT&T: "Further Details and Techniques on LTE and NR Co-Existence", 3GPP Draft; R1-1702281, LTE & NR Co-Existence, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017 (Feb. 12, 2017), XP051209435, 5 pages, Retrieved from the Internet: URL: http://www.3gpp.org/ftp/Meetings_3GPP_SYNC/RAN1/Docs/ [retrieved on Feb. 12, 2017].

Samsung: "Signaling of Resources for forward compatibility", 3GPP Draft; R1-1609136 Forward Compatibility Signaling Final, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016, Oct. 9, 2016 (Oct. 9, 2016), XP051149184, Retrieved from the Internet: URL: http://www.3gpp.org/ftp/Meetings_3GPP_SYNC/RAN1/Docs/ [retrieved on Oct. 9, 2016].

VIVO: "MBMS Design in Mini-slot below 6 GHz", 3GPP Draft; R1-1700282_MBMS Design in Mini-Slot Below 6 Ghz, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017 Jan. 16, 2017 (Jan. 16, 2017), XP051207820, 5 pages, Retrieved from the Internet: URL: http://www.3gpp.org/ftp/Meetings_3GPP_SYNC/RAN1/Docs/ [retrieved on Jan. 16, 2017].

* cited by examiner

BROADCAST OR MULTICAST PHYSICAL LAYER CONFIGURATION AND CHANNEL STRUCTURE

CROSS REFERENCES

The present Application for patent claims priority to U.S. Provisional Patent Application No. 62/474,038 by PATEL, et al., entitled "Broadcast or Multicast Physical Layer Configuration and Channel Structure For New Radio System," filed Mar. 20, 2017, assigned to the assignee hereof.

BACKGROUND

The following relates generally to wireless communication and more specifically to a broadcast or multicast physical layer configuration and channel structure.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system).

A wireless multiple-access communications system may include a number of base stations or access network nodes, each simultaneously supporting communication for multiple communication devices, which may be otherwise known as user equipment (UE). In some wireless communications systems (e.g., NR systems), a base station may configure time and frequency resources dynamically for communication in a specific link direction (e.g., uplink, downlink, sidelink, etc.) based on, for example, traffic conditions in a specific link direction. As a result, it may be challenging for a base station to schedule transmissions of broadcast or multicast data to a group of UEs.

SUMMARY

Some wireless communications systems (e.g., New Radio (NR) systems) may support the dynamic configuration of time intervals (e.g., slots) for communication in a specific link direction (e.g., uplink, downlink, sidelink, etc.). In such cases, a base station may dynamically allocate time intervals (e.g., slots) for broadcast or multicast data (e.g., via a physical downlink control channel (PDCCH)) based on the dynamically determined configuration of certain time intervals (or slots). The dynamic allocation of resources for broadcast or multicast data may ensure that broadcast or multicast data is not scheduled to be transmitted during time intervals configured for uplink communication. In some cases, the broadcast or multicast data may be transmitted on a portion of a system bandwidth that is frequency division multiplexed with another portion of the system bandwidth allocated for mobile broadband (MBB) communications.

A method for wireless communication is described. The method may include receiving an indication of a set of resources allocated for downlink transmissions, identifying a first portion of a system bandwidth allocated for broadcast or multicast data transmissions on the set of resources from one or more base stations in a single frequency network (SFN), the first portion of the system bandwidth being frequency division multiplexed with a second portion of the system bandwidth allocated for MBB transmissions on the set of resources, and receiving broadcast or multicast data on the first portion of the system bandwidth on the set of resources based at least in part on the identifying.

An apparatus for wireless communication is described. The apparatus may include means for receiving an indication of a set of resources allocated for downlink transmissions, means for identifying a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and means for receiving broadcast or multicast data on the first portion of the system bandwidth on the set of resources based at least in part on the identifying.

Another apparatus for wireless communication is described. The apparatus may include a processor, memory in electronic communication with the processor, and instructions stored in the memory. The instructions may be operable to cause the processor to receive an indication of a set of resources allocated for downlink transmissions, identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and receive broadcast or multicast data on the first portion of the system bandwidth on the set of resources based at least in part on the identifying.

A non-transitory computer-readable medium for wireless communication is described. The non-transitory computer-readable medium may include instructions operable to cause a processor to receive an indication of a set of resources allocated for downlink transmissions, identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and receive broadcast or multicast data on the first portion of the system bandwidth on the set of resources based at least in part on the identifying.

In some examples of the method, apparatus, and non-transitory computer-readable medium described above, the broadcast or multicast data may be received during a first downlink slot on the first portion of the system bandwidth and other broadcast or multicast data may be received during a subsequent downlink slot on the first portion of the system bandwidth. In some examples of the method, apparatus, and non-transitory computer-readable medium described above, the indication of the set of resources allocated for downlink transmissions further identifies another set of resources allocated for uplink transmissions that may be time division multiplexed with the set of resources allocated for downlink transmissions.

In some examples of the method, apparatus, and non-transitory computer-readable medium described above, the indication may be received in radio resource control (RRC) signaling. In some examples of the method, apparatus, and non-transitory computer-readable medium described above, the indication may be received in a downlink control message in a PDCCH. In some examples of the method, apparatus, and non-transitory computer-readable medium described above, the set of resources allocated for downlink transmissions includes time resources of one or more downlink slots and the other set of resources allocated for uplink transmissions includes time resources of one or more uplink slots.

Some examples of the method, apparatus, and non-transitory computer-readable medium described above may further include processes, features, means, or instructions for identifying a reassignment of a portion of the set of resources during a time interval for another type of communications and receiving data configured with an outer code in a subsequent portion of the time interval based at least in part on identifying the reassignment, where the data configured with the outer code includes broadcast or multicast data punctured by the other type of communications.

Some examples of the method, apparatus, and non-transitory computer-readable medium described above may further include processes, features, means, or instructions for identifying a reassignment of a portion of the set of resources during a time interval for another type of communications and receiving data in a subsequent time interval based at least in part on identifying the reassignment, where the data received in the subsequent time interval includes broadcast or multicast data punctured by the other type of communications.

Some examples of the method, apparatus, and non-transitory computer-readable medium described above may further include processes, features, means, or instructions for identifying a reassignment of a portion of the set of resources during a time interval for another type of communications, receiving a first portion of data configured with an outer code in a subsequent portion of the time interval based at least in part on identifying the reassignment, where the first portion of data configured with the outer code includes a first portion of broadcast or multicast data punctured by the other type of communications, and receiving a second portion of data in a subsequent time interval based at least in part on identifying the reassignment, where the second portion of data received in the subsequent time interval includes a second portion of broadcast or multicast data punctured by the other type of communications.

In some examples of the method, apparatus, and non-transitory computer-readable medium described above, the set of resources includes an aggregated set of two or more downlink-centric slots. In some examples of the method, apparatus, and non-transitory computer-readable medium described above, the broadcast or multicast data may be received on a multimedia broadcast multicast service (MBMS) traffic channel (MTCH) or a physical downlink shared channel (PDSCH). In some examples of the method, apparatus, and non-transitory computer-readable medium described above, the broadcast or multicast data may be received based at least in part on a discontinuous reception (DRX) cycle.

A method for wireless communication is described. The method may include transmitting an indication of a set of resources allocated for downlink transmissions, identifying a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and transmitting broadcast or multicast data on the first portion of the system bandwidth on the set of resources as part of an SFN transmission based at least in part on the identifying.

An apparatus for wireless communication is described. The apparatus may include means for transmitting an indication of a set of resources allocated for downlink transmissions, means for identifying a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and means for transmitting broadcast or multicast data on the first portion of the system bandwidth on the set of resources as part of an SFN transmission based at least in part on the identifying.

Another apparatus for wireless communication is described. The apparatus may include a processor, memory in electronic communication with the processor, and instructions stored in the memory. The instructions may be operable to cause the processor to transmit an indication of a set of resources allocated for downlink transmissions, identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and transmit broadcast or multicast data on the first portion of the system bandwidth on the set of resources as part of an SFN transmission based at least in part on the identifying.

A non-transitory computer-readable medium for wireless communication is described. The non-transitory computer-readable medium may include instructions operable to cause a processor to transmit an indication of a set of resources allocated for downlink transmissions, identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources, and transmit broadcast or multicast data on the first portion of the system bandwidth on the set of resources as part of an SFN transmission based at least in part on the identifying.

In some examples of the method, apparatus, and non-transitory computer-readable medium described above, the broadcast or multicast data may be transmitted during a first downlink slot on the first portion of the system bandwidth and other broadcast or multicast data may be transmitted during a subsequent downlink slot on the first portion of the system bandwidth. In some examples of the method, apparatus, and non-transitory computer-readable medium described above, the indication of the set of resources allocated for downlink transmissions further identifies another set of resources allocated for uplink transmissions that may be time division multiplexed with the set of resources allocated for downlink transmissions.

In some examples of the method, apparatus, and non-transitory computer-readable medium described above, the indication may be transmitted in RRC signaling. In some examples of the method, apparatus, and non-transitory computer-readable medium described above, the indication may be transmitted in a downlink control message in a PDCCH. In some examples of the method, apparatus, and non-transitory computer-readable medium described above, the set of resources allocated for downlink transmissions includes time resources of one or more downlink slots and the other set of resources allocated for uplink transmissions includes time resources of one or more uplink slots.

Some examples of the method, apparatus, and non-transitory computer-readable medium described above may further include processes, features, means, or instructions for identifying a reassignment of a portion of the set of resources during a time interval for another type of communications and transmitting data configured with an outer code in a subsequent portion of the time interval based at least in part on identifying the reassignment, where the data configured with the outer code includes broadcast or multicast data punctured by the other type of communications.

Some examples of the method, apparatus, and non-transitory computer-readable medium described above may further include processes, features, means, or instructions for identifying a reassignment of a portion of the set of resources during a time interval for another type of communications and transmitting data in a subsequent time interval based at least in part on identifying the reassignment, where the data transmitted in the subsequent time interval includes broadcast or multicast data punctured by the other type of communications.

Some examples of the method, apparatus, and non-transitory computer-readable medium described above may further include processes, features, means, or instructions for identifying a reassignment of a portion of the set of resources during a time interval for another type of communications, transmitting a first portion of data configured with an outer code in a subsequent portion of the time interval based at least in part on identifying the reassignment, where the first portion of data configured with the outer code includes a first portion of broadcast or multicast data punctured by the other type of communications, and transmitting a second portion of data in a subsequent time interval based at least in part on identifying the reassignment, where the second portion of data transmitted in the subsequent time interval includes a second portion of broadcast or multicast data punctured by the other type of communications.

In some examples of the method, apparatus, and non-transitory computer-readable medium described above, the set of resources includes an aggregated set of two or more downlink-centric slots. In some examples of the method, apparatus, and non-transitory computer-readable medium described above, the broadcast or multicast data may be transmitted on an MTCH or a PDSCH. In some examples of the method, apparatus, and non-transitory computer-readable medium described above, the broadcast or multicast data may be transmitted based at least in part on a discontinuous transmission (DTX) cycle.

DETAILED DESCRIPTION

As the demand for wireless data increases, the efficient use of resources becomes increasingly important. Accordingly, a wireless communications system (e.g., a New Radio (NR) system) may support the flexible configuration of resources (e.g., for either uplink or downlink communication) to efficiently allocate resources. For example, a base station may dynamically signal the configuration of time intervals (or slots) used for communication with user equipment (UEs) based on, for example, traffic conditions in a specific link direction. Various users and applications may benefit from broadcast or multicast communications in a system that supports multiple, concurrent services and frequent uplink traffic. Efficient techniques for scheduling transmissions of broadcast or multicast data based on the dynamic configuration of time intervals may be desirable to improve throughput in a wireless communications system.

As described herein, a base station may support dynamic signaling to indicate resources for broadcast or multicast data based on the configuration of time intervals (i.e., whether a time interval is configured for uplink or downlink communication). As an example, a base station may transmit the indication of the resources for broadcast or multicast data on physical downlink control channel (PDCCH) resources. On time resources allocated for broadcast or multicast data, the base station may allocate a portion of a system bandwidth for the transmission of the broadcast or multicast data and another portion of the system bandwidth for the transmission of mobile broadband (MBB) downlink data (e.g., a unicast transmission). In some cases, the portion of the system bandwidth allocated for broadcast or multicast data may be frequency division multiplexed with the portion of the system bandwidth allocated for MBB communications.

Aspects of the disclosure introduced above are described below in the context of a wireless communications system. Examples of processes and signaling exchanges that support a broadcast or multicast physical layer configuration and channel structure are then described. Aspects of the disclosure are further illustrated by and described with reference to apparatus diagrams, system diagrams, and flowcharts that relate to a broadcast or multicast physical layer configuration and channel structure.

Figure 1:
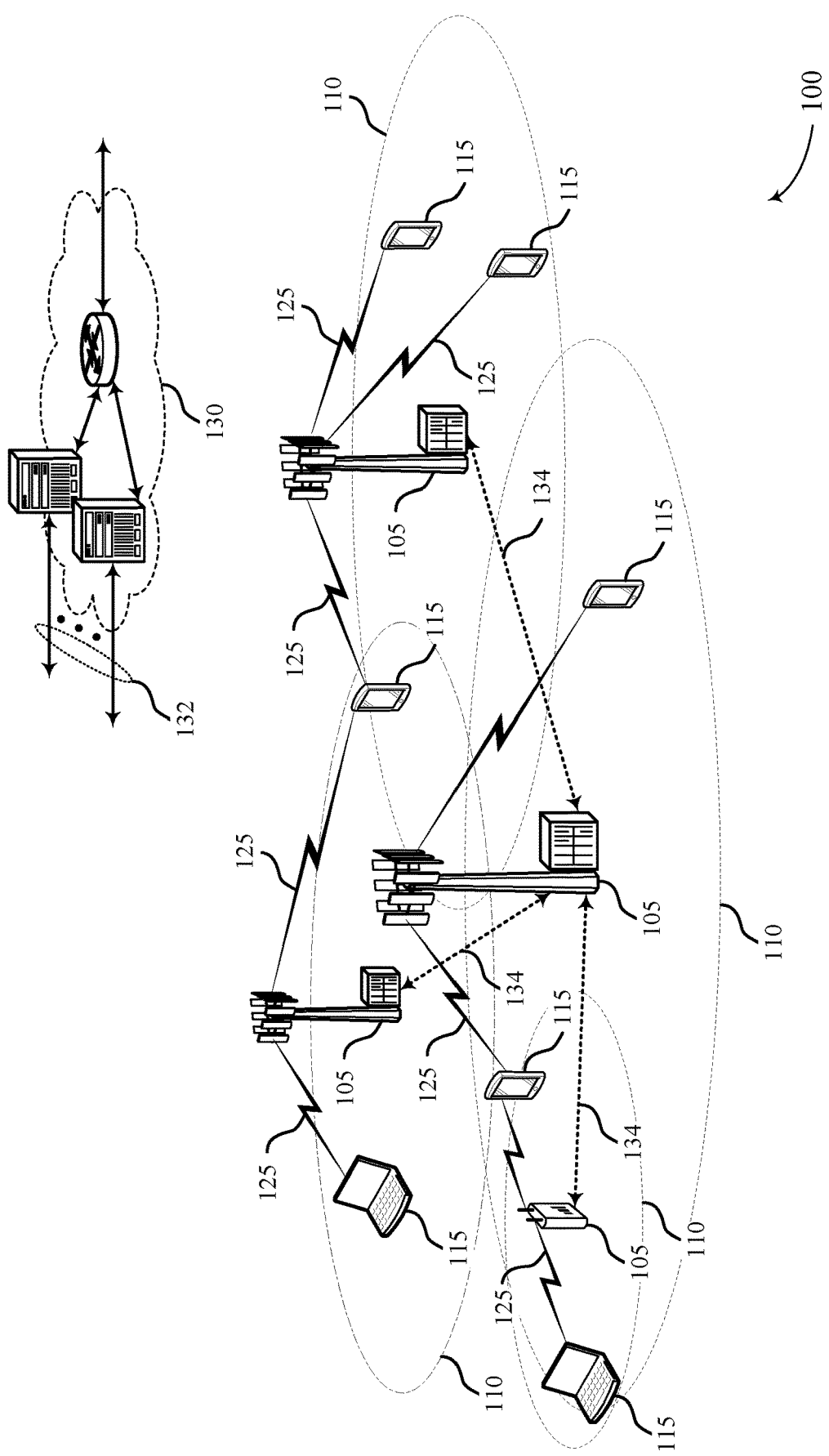
FIG. 1 illustrates an example of a wireless communications system that supports a broadcast or multicast physical layer configuration and channel structure in accordance with various aspects of the present disclosure.

FIG. 1 illustrates an example of a wireless communications system 100 that supports a broadcast or multicast physical layer configuration and channel structure in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or an NR network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions from a base station 105 to a UE 115. Control information and data may be multiplexed on an uplink or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, an automobile component, a train, a train component, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by a backhaul link (e.g., an S1 interface) to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide multimedia broadcast multicast services (MBMSs), user authentication, access authorization, tracking, IP connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Time intervals in LTE or NR may be expressed in multiples of a basic time unit (which may be a sampling period of $T_s = 1/30,720,000$ seconds). Time resources may be organized according to radio frames of length of 10 ms ($T_f = 307200 T_s$), which may be identified by a system frame number ranging from 0 to 1023. Each frame may include ten 1 ms subframes numbered from 0 to 9. A subframe may be further divided into two 0.5 ms slots, each of which contains 6 or 7 symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

Wireless communications system 100 may support the use of frequency resources with scalable carrier spacing (e.g., 15 kHz, 30 kHz, etc.) and the use of time resources with variable slot durations (e.g., 0.5 ms, 0.25 ms, etc.). A resource element may consist of one symbol period and one subcarrier (e.g., a 15 kHz frequency range). A resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

In wireless communications system 100, a base station may broadcast System Information (SI) in system information blocks (SIBs), each of which may contain a set of functionally-related parameters. Different SIBs may be defined according to the type of system information conveyed. For instance, SIB1 may include access information, such as cell identity information, and may also indicate whether a UE 115 is allowed to camp on a cell. SIB 1 also includes cell selection information (or cell selection parameters). Additionally, SIB1 may include scheduling information for other SIBs. SIB2 may include access information and parameters related to common and shared channels. SIB13 may include information related to MBMS configurations. SIB20 may include information that indicates a configuration of a multicast control channel (MCCH), or it may otherwise indicate to a UE 115 how to receive control information related to single-cell point-to-multipoint (SC-PTM) transmissions or single frequency network (SFN) transmissions. Other SIBs may also be defined and may relate to MBMS, SC-PTM, or SFN services.

In one example, a base station 105 may support SC-PTM transmissions for the transmission of broadcast or multicast data to a group of UEs 115. The base station 105 may transmit control information in a SIB to enable a group of UEs 115 to receive an SC-PTM transmission of broadcast or multicast data. The SIB may include information such as a temporary group identifier (TMGI), group radio network temporary identifier (RNTI) (G-RNTI), and transmission mode parameters. The SIB may also include information associated with a single-cell multicast control channel (SC-MCCH), such as the modification period of the SC-MCCH, the repetition period of transmissions on the SC-MCCH, and the subframe offset used for transmissions on the SC-MCCH. The base station may then schedule the transmission of control information on the SC-MCCH using a single-cell RNTI (SC-RNTI) transmitted on PDCCH resources.

In some cases, the control information transmitted on the SC-MCCH may provide information about a DRX cycle used for the transmission of broadcast or multicast traffic on a single-cell multicast traffic channel (SC-MTCH). Specifically, the control information transmitted on the SC-MCCH may indicate the scheduling cycle (e.g., the starting offset and the wakeup cycle duration) used for transmissions on the SC-MTCH. The SC-MCCH may also indicate an on-duration and an inactivity timer for receiving UEs operating according to the DRX cycle. The on-duration may indicate the time a receiving UE 115 may stay awake to receive information on the PDCCH, and the inactivity timer may indicate the time a UE may stay awake before entering a sleep mode in the DRX cycle after successfully decoding a transmission on the PDCCH. Each time a receiving UE 115 is able to successfully decode a transmission on the PDCCH, the UE may restart the inactivity timer. The SC-MCCH and SC-MTCH may both be mapped to a downlink shared channel (DL-SCH) and may be transmitted on a physical downlink shared channel (PDSCH).

In another example, multiple synchronized base stations 105 forming an SFN may transmit broadcast or multicast data to multiple UEs 115 within a mobile broadband SFN (MBSFN) synchronization area. An MBSFN synchronization area may include a group of synchronized base stations (e.g., base stations 105) that may broadcast the same content at the same time using the same frequency resources. The synchronized base stations 105 may communicate using an MBMS channel (MCH) including a control channel (MCCH) and traffic channel (MTCH). A base station 105 may send control information (e.g., configuration to receive the MBMS services) to UEs 115 via the MCCH, and the base station may send broadcast data to the UEs 115 (e.g., a television station) via the MTCH. The collective transmission from multiple base stations on these channels may allow for increased signal power of transmissions to multiple UEs 115 due to constructive interference, which may improve the reliability of broadcast or multicast data transmissions in wireless communications system 100.

In some cases, the resources used to transmit broadcast or multicast data may be semi-statically allocated. However, this may be problematic for wireless communications systems that support the dynamic configuration of time intervals (or slots) used for communication with UEs 115. For instance, if resources for broadcast or multicast data transmissions are allocated semi-statically and time resources are configured dynamically, a broadcast or multicast data transmission may be scheduled on time resources dynamically configured for uplink communications. In such cases, a base station 105 may refrain from transmitting the broadcast or multicast data, which may be detrimental to a wireless communications system.

Wireless communications system 100 may support efficient techniques for transmitting broadcast or multicast data in a system that supports the dynamic configuration of resources, including time resources, such as slots. Specifically, a base station 105 may dynamically allocate resources for the transmission of broadcast or multicast data after identifying the configuration of slots used for communication with UEs 115. For example, the base station 105 may transmit control information on a PDCCH that allocates resources for the transmission of broadcast or multicast data based on determining the configuration of a number of slots. Further, on time resources allocated for broadcast or multicast data, the base station may allocate a portion of a system bandwidth for the transmission of the broadcast or multicast data and another portion of the system bandwidth for the transmission of MBB downlink data (e.g., a unicast transmission).

Figure 2:
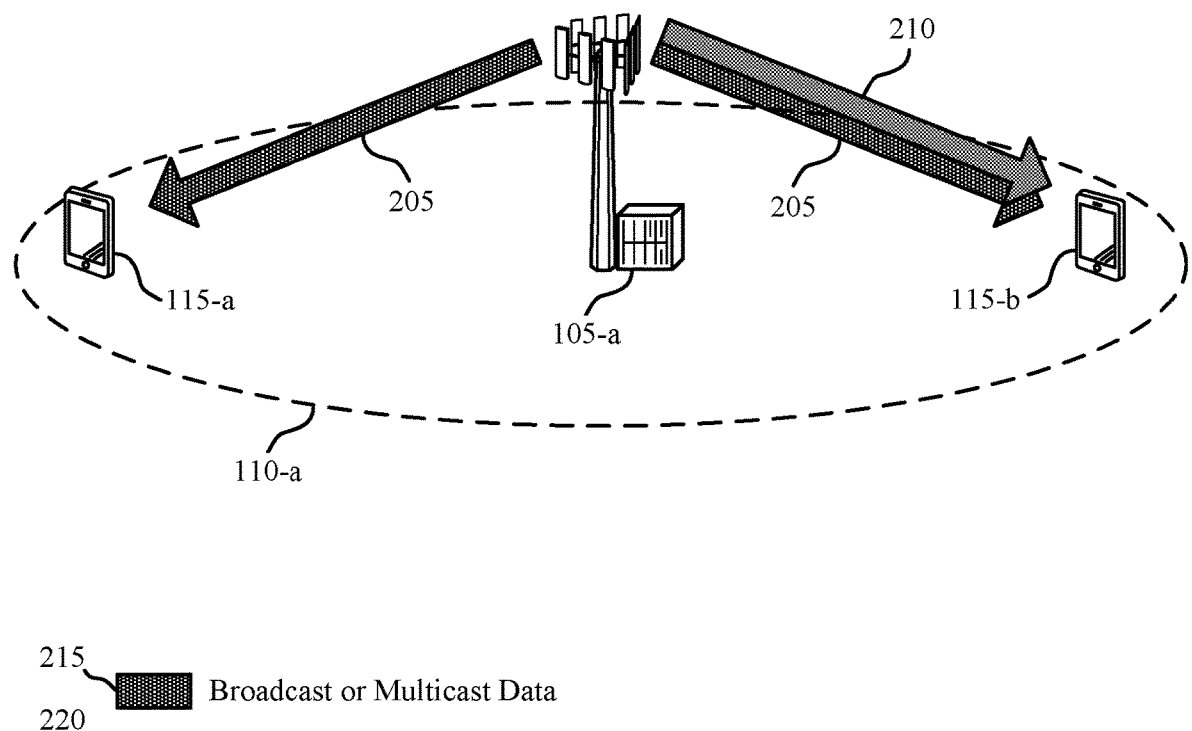
FIG. 2 illustrates an example of a wireless communications system that supports a broadcast or multicast physical layer configuration and channel structure in accordance with various aspects of the present disclosure.

FIG. 2 illustrates an example of a wireless communications system 200 that supports a broadcast or multicast physical layer configuration and channel structure in accordance with various aspects of the present disclosure. Wireless communications system 200 includes base station 105-*a*, UE 115-*a*, and UE 115-*b*, which may be examples of a base station 105 and UEs 115 described with reference to FIG. 1. Base station 105-*a* may provide communication coverage for coverage area 110-*a*. Base station 105-*a* may transmit broadcast or multicast data 215 to UE 115-*a* and UE 115-*b* on resources of a carrier 205. The transmission of the broadcast or multicast data may be an SC-PTM transmission or an SFN transmission. Base station 105-*a* may also transmit MBB downlink data 220 to UE 115-*b* on resources of a carrier 210.

In wireless communications system 200, time intervals used for communication with UEs 115 in coverage area 110-*a* (e.g., on resources of carriers 205 and 210) may be configured dynamically. For example, a base station 105-*a* may dynamically determine which time intervals (e.g., slots) to use for downlink communication (e.g., downlink-centric slots) and which time intervals (e.g., slots) to use for uplink communication (e.g., uplink-centric slots) based on the traffic in the downlink and uplink directions. Accordingly, conventional techniques of pre-configuring time intervals for the transmission of broadcast or multicast data may be problematic since, in this case, the transmission of the broadcast or multicast data may be scheduled on uplink resources. As a result, a base station may not be able to transmit the broadcast or multicast data and this may result in reduced throughput.

Wireless communications system 200 may support efficient techniques for dynamically signaling resources for the transmission of broadcast or multicast data based on the dynamic configuration of time intervals (or slots). Specifically, base station 105-*a* may identify time intervals (or slots) designated for downlink communication and dynamically allocate these time intervals (or slots) for the transmission of broadcast or multicast data. In some cases, the indication of the resources allocated for broadcast or multicast data may be signaled using control information transmitted on a PDCCH or an MCCH, and the broadcast or multicast data may be transmitted on a PDSCH or an MTCH.

In the example of FIG. 2, the resources used for the transmission of broadcast or multicast data 215 may be frequency division multiplexed with the resources used for the transmission of MBB downlink data 220. In some cases, base station 105-a may transmit the broadcast or multicast data 215 based on a DTX cycle. The DTX cycle may indicate a range of time intervals that may be used for the transmission of the broadcast or multicast data. Once the time intervals are configured for either uplink or downlink communication, the base station 105-a may allocate the specific time intervals within the range of time intervals to be used for the transmission of broadcast or multicast data 215. UE 115-a and UE 115-b may be configured to transition between a sleep mode and a wakeup mode based on a DRX cycle that is synchronized with the DTX cycle, and these UEs may receive the broadcast or multicast data 215 based on the DRX cycle.

Figure 3:
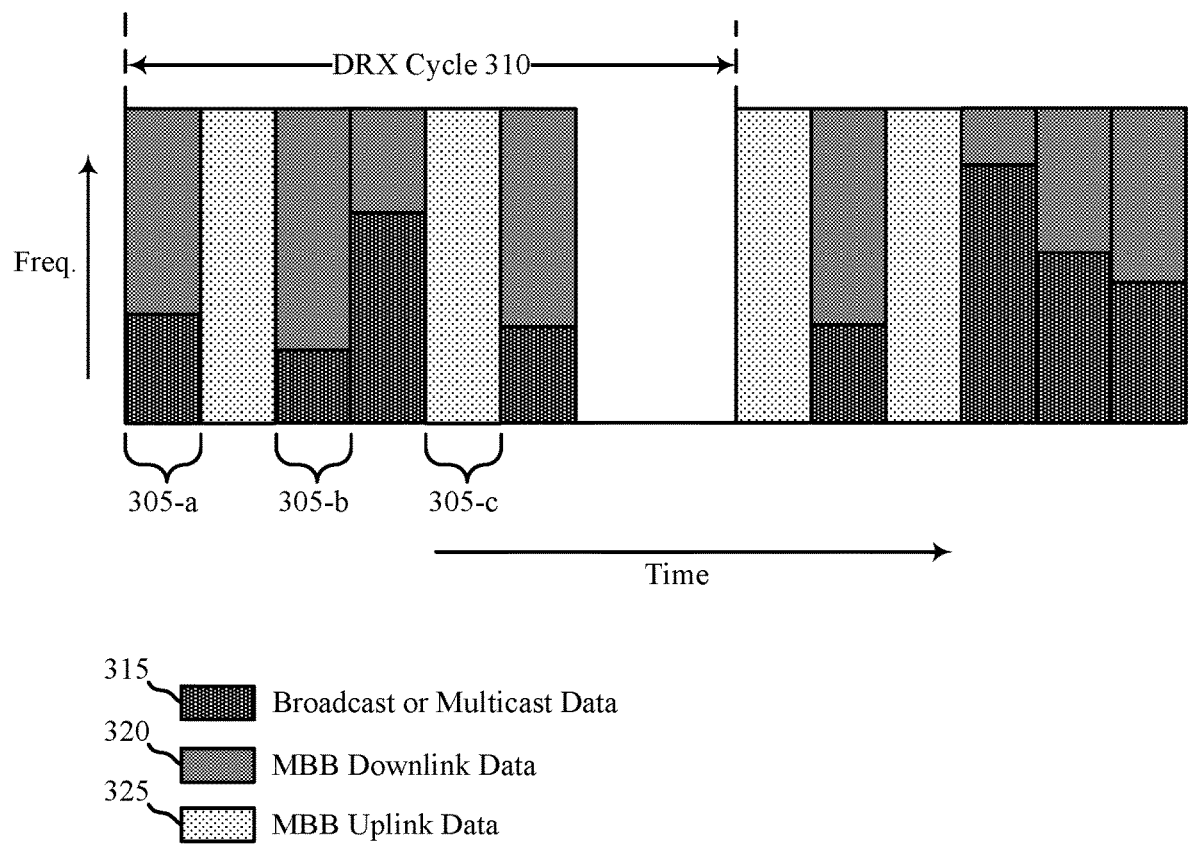
FIGS. 3-7 illustrate examples of time intervals (e.g., slots) allocated for MBB communications and broadcast or multicast data transmissions in accordance with various aspects of the present disclosure.

FIG. 3 illustrates an example of time intervals (e.g., slots) 300 allocated for MBB communications and broadcast or multicast data transmissions in accordance with various aspects of the present disclosure. In some wireless communications systems (e.g., NR systems), a base station may dynamically configure time intervals for communication in a specific link direction. For example, the base station may dynamically configure a time interval 305-a for downlink communication (e.g., as a downlink-centric slot) and a time interval 305-c for uplink communication (e.g., as an uplink-centric slot for MBB uplink data 325). The dynamic configuration of resources may allow the base station to flexibly configure resources based on, for example, traffic conditions in a specific link direction.

In some cases, a base station may identify broadcast or multicast data 315 to transmit to a group of UEs, and the base station may also identify MBB downlink data 320 to transmit to one or more UEs. The base station may allocate a portion of a system bandwidth for transmission of the broadcast or multicast data 315 and a next portion of the system bandwidth for transmission of the MBB downlink data 320. That is, the base station may multiplex broadcast or multicast data 315 and MBB downlink data 320 in the frequency domain. In the example of FIG. 3, the transmission of the broadcast or multicast data 315 may be an example of an SC-PTM transmission from a single base station.

Because the transmission of the broadcast or multicast data 315 is from a single source, the base station may not have to synchronize with other base stations before transmitting the broadcast or multicast data 315. Thus, using limited signaling, the base station may be able to allocate different portions of a system bandwidth for the transmission of broadcast or multicast data 315 across different time intervals. For example, the base station may transmit broadcast or multicast data 315 during time interval 305-a on a first portion of a system bandwidth and the base station may transmit broadcast or multicast data 315 during time interval 305-b on a second portion of the system bandwidth that is different from the first portion of the system bandwidth.

In order to reduce the amount of resources used for the transmission of broadcast or multicast data, the base station may be restricted to a specific portion of the system bandwidth for the transmission of the broadcast or multicast data 315 (e.g., restricted to a predetermined number of subcarriers). The use of a restricted sub-band for broadcast or multicast transmissions may also result in the reduction of the front end processing rates and demodulator processing rates at a receiving UE (e.g., a UE primarily receiving broadcast or multicast data). Additionally, to further reduce overhead, a base station may transmit and a UE may receive downlink and uplink control information within the same bandwidth used for the transmission of broadcast or multicast data 315.

The transmission of broadcast or multicast data 315 may, in some cases, be on resources of an SC-MTCH of a shared data channel (e.g., a DL-SCH). In such cases, the transmission on the SC-MTCH may be scheduled using a control transmission on an SC-MCCH. The control transmission on the SC-MCCH and the transmission of broadcast or multicast data may be periodic and may be scheduled dynamically using the techniques described herein. The periodic transmission of broadcast or multicast data may be based on a DTX cycle 310. Although the exact time intervals used for broadcast or multicast data transmissions may not be scheduled semi-statically, the periodicity, starting offset, duration of inactivity timer, etc. of the DTX cycle 310 may be scheduled semi-statically, and a base station may transmit broadcast or multicast data 315 to a UE based on the DTX cycle 310 (e.g., on resources available for broadcast or multicast data transmissions in the on-durations of the DTX cycle 310).

Figure 4:
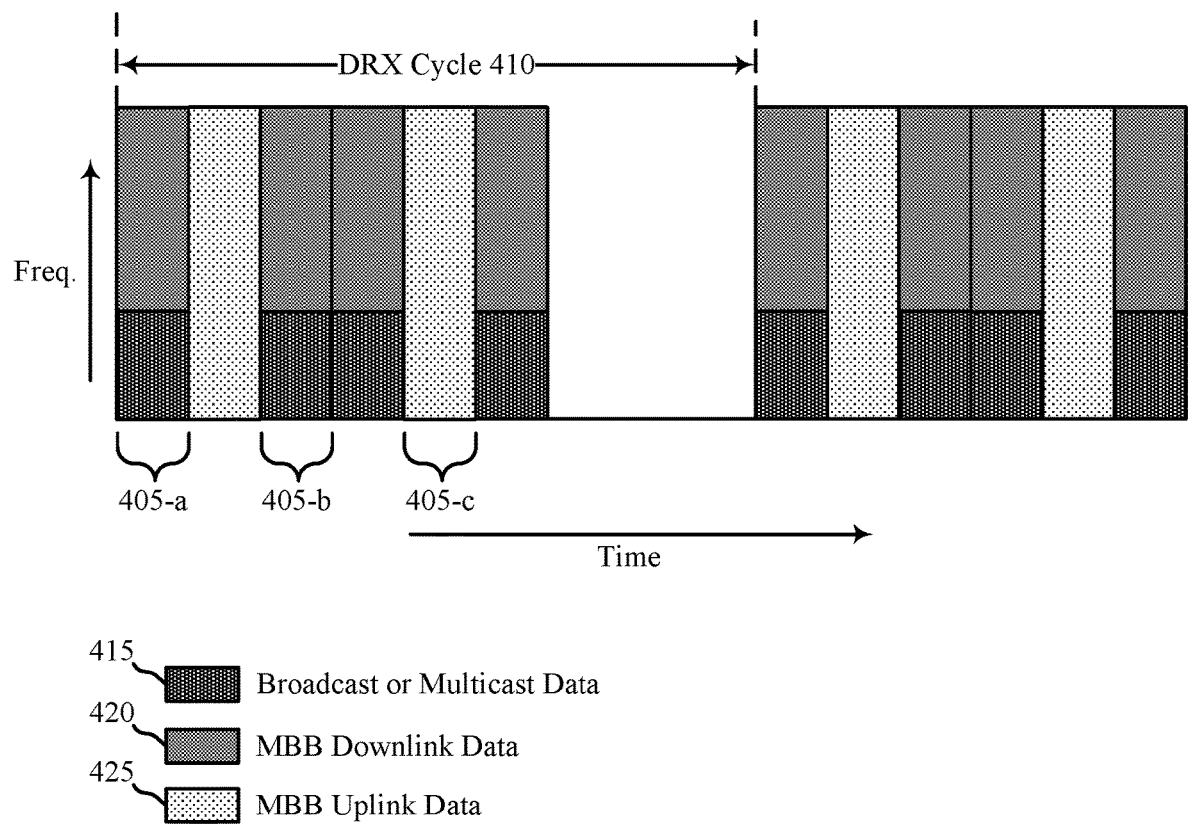

FIG. 4 illustrates an example of time intervals (e.g., slots) 400 allocated for MBB communications and broadcast or multicast data transmissions in accordance with various aspects of the present disclosure. In some wireless communications systems (e.g., NR systems), a base station may dynamically configure time intervals for communication in a specific link direction. For example, the base station may dynamically configure a time interval 405-a for downlink communication (e.g., as a downlink centric slot) and a time interval 405-c for uplink communication (e.g., as an uplink-centric slot for MBB uplink data 425). The dynamic configuration of resources may allow the base station to flexibly configure resources based on, for example, traffic conditions in a specific link direction.

In some cases, a base station may identify broadcast or multicast data 415 to transmit to a group of UEs, and the base station may also identify MBB downlink data 420 to transmit to one or more UEs. The base station may allocate a portion of a system bandwidth for transmission of the broadcast or multicast data 415 and a next portion of the system bandwidth for transmission of the MBB downlink data 420. That is, the base station may multiplex broadcast or multicast data 415 and MBB downlink data 420 in the frequency domain. In the example of FIG. 4, the transmission of the broadcast or multicast data 415 may be an example of a transmission from multiple base stations in an SFN.

Because the transmission of the broadcast or multicast data 415 is from multiple base stations in an SFN, it may be appropriate for the base stations in the SFN to be synchronized (i.e., transmit on the same time and frequency resources). As such, a wireless communications system may support signaling to base stations in the SFN to ensure that each base station in the SFN is configured to use the same resources for a transmission of broadcast or multicast data. However, if a different portion of a system bandwidth is used for the transmission of the broadcast or multicast data in different time intervals, the base stations may have to support additional signaling to ensure that all base stations in the SFN use the same resources in each time interval, which may result in high overhead. To reduce overhead, the base stations in the SFN may be configured to transmit broadcast or multicast data on a predetermined (e.g., static or semi-static) portion of a system bandwidth (as illustrated).

The transmission of broadcast or multicast data 415 may, in some cases, be on resources of an MTCH. In such cases, the transmission on the MTCH may be scheduled using a control transmission on an MCCH. The control transmission on the MCCH and the transmission of broadcast or multicast data may be periodic and may be scheduled dynamically using the techniques described herein. The periodic transmission of broadcast or multicast data may be based on a DTX cycle 410. Although the exact time intervals used for broadcast or multicast data transmissions may not be scheduled semi-statically, the periodicity, starting offset, duration of inactivity timer, etc. of the DTX cycle 410 may be scheduled semi-statically, and a base station may transmit broadcast or multicast data 415 to a UE based on the DTX cycle 410 (e.g., on resources available for broadcast or multicast data transmissions in the on-durations of the DTX cycle 410).

Figure 5:
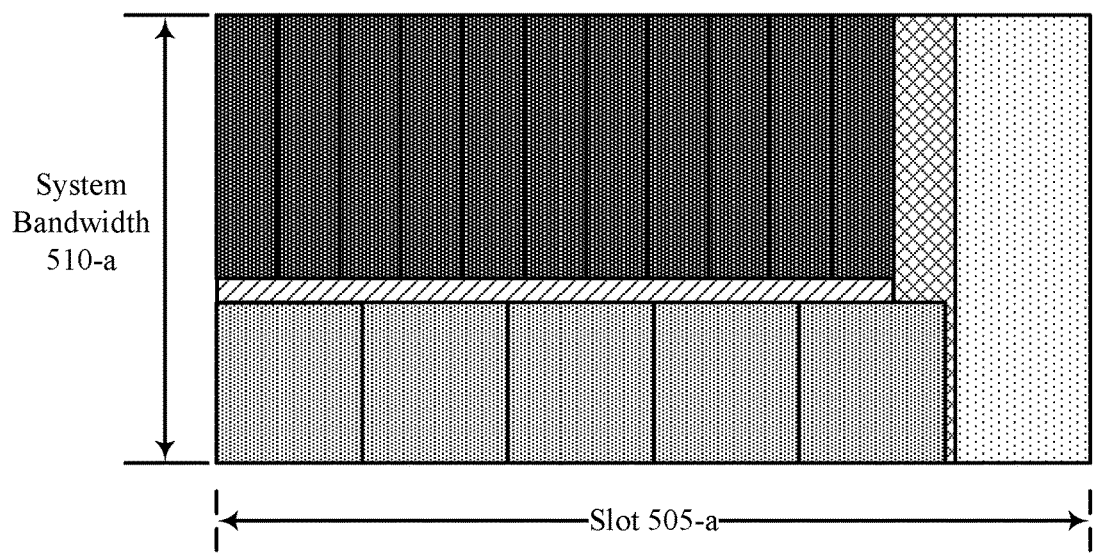
Figure 5:
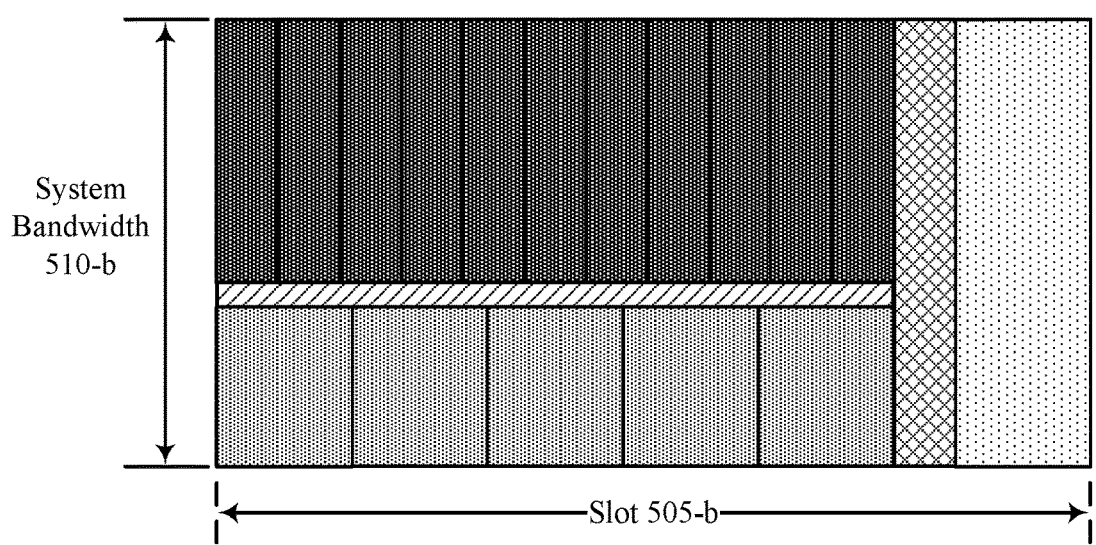

FIG. 5 illustrates an example of time intervals (e.g., slots) 500 allocated for MBB communications and broadcast or multicast data transmissions in accordance with various aspects of the present disclosure. In some wireless communications systems (e.g., NR systems), a base station may dynamically configure time intervals and frequency resources for communication in a specific link direction. For example, the base station may dynamically configure a slot 505 for downlink communication (e.g., as a downlink-centric slot) on a system bandwidth 510. The dynamic configuration of resources may allow the base station to flexibly configure resources based on, for example, traffic conditions in a specific link direction.

As mentioned above, slot 505 may be configured as a downlink-centric slot and a base station may transmit broadcast or multicast data 515 and MBB downlink data 520 in a downlink portion of slot 505. A first portion of the system bandwidth 510 may be allocated for the transmission of MBB downlink data 520 and a second portion of the system bandwidth 510 may be allocated for the transmission of broadcast or multicast data 515. The first portion of the system bandwidth 510 and the second portion of the system bandwidth 510 may be separated by a guard band 530 to prevent interference between the transmissions. The base station may also receive MBB uplink data 525 in an uplink portion of slot 505. The downlink portion of the slot 505 and the uplink portion of the slot 505 may be separated by a guard period 535 to allow a UE to transition from a downlink configuration to an uplink configuration.

The base station and the UE may communicate using various configurations in slot 505. As an example, Table 1 illustrates various configurations for a slot with a duration of 0.5 ms used for communication on a 10 MHz bandwidth.

TABLE 1

Exemplary slot configurations

| Fast Fourier Transform (FFT) Size | Sub-carrier Spacing (SCS) | Cyclic Prefix (CP) Size | CP Duration/s | Number of Symbols per Slot | % CP of Symbol |
|---|---|---|---|---|---|
| 4096 | 30000 | 1024 | 8.33E−06 | 12 | 25% |
| 8192 | 15000 | 2048 | 1.67E−05 | 6 | 25% |
| 12288 | 10000 | 3072 | 2.50E−05 | 4 | 25% |
| 16384 | 7500 | 4096 | 3.33E−05 | 3 | 25% |
| 24576 | 5000 | 6144 | 5.00E−05 | 2 | 25% |
| 49152 | 2500 | 12288 | 1.00E−04 | 1 | 25% |

In slot 505-a, a base station may transmit the broadcast or multicast data 515 during five (5) symbol periods with a 16.6 μs CP duration. However, as illustrated, the numerology used for the transmission of the broadcast or multicast data 515 may not be compatible with the numerology used for the transmission of MBB downlink data 520. Specifically, the transmission of the broadcast or multicast data 515 may overlap with the guard period 535 used for transitioning from a downlink configuration to an uplink configuration. In such cases, a receiving UE may not be able to receive all of the broadcast or multicast data from a base station, or the receiving UE may not have sufficient time to transition between configurations. As a result, a wireless communications system may experience reduced throughput.

Some wireless communications systems may support efficient techniques for ensuring that there is no overlap between transmissions of broadcast or multicast data 515 and a guard period 535. As an example, a base station may adjust the configurations of a slot used for the transmission of broadcast or multicast data 515 to a group of UEs. In slot 505-b, a base station may transmit the broadcast or multicast data 515 during 5 symbol periods with a 11.9 μs CP duration. Other examples of configurations that may be compatible with configurations used for MBB communications are illustrated in Table 2 below.

TABLE 2

Exemplary slot configurations to prevent transmissions within a guard period

| FFT Size | SCS | CP Size | CP Duration/s | Number of Symbols per Slot | % CP of Symbol |
|---|---|---|---|---|---|
| 4096 | 30000 | 732.8 | 5.96E−06 | 10 | 18% |
| 4096 | 30000 | 1269.33 | 1.03E−05 | 9 | 31% |
| 8192 | 15000 | 1465.6 | 1.19E−05 | 5 | 18% |
| 12288 | 10000 | 3808 | 3.10E−05 | 3 | 31% |
| 36864 | 3333.3 | 11424 | 9.30E−05 | 1 | 31% |

Figure 6:
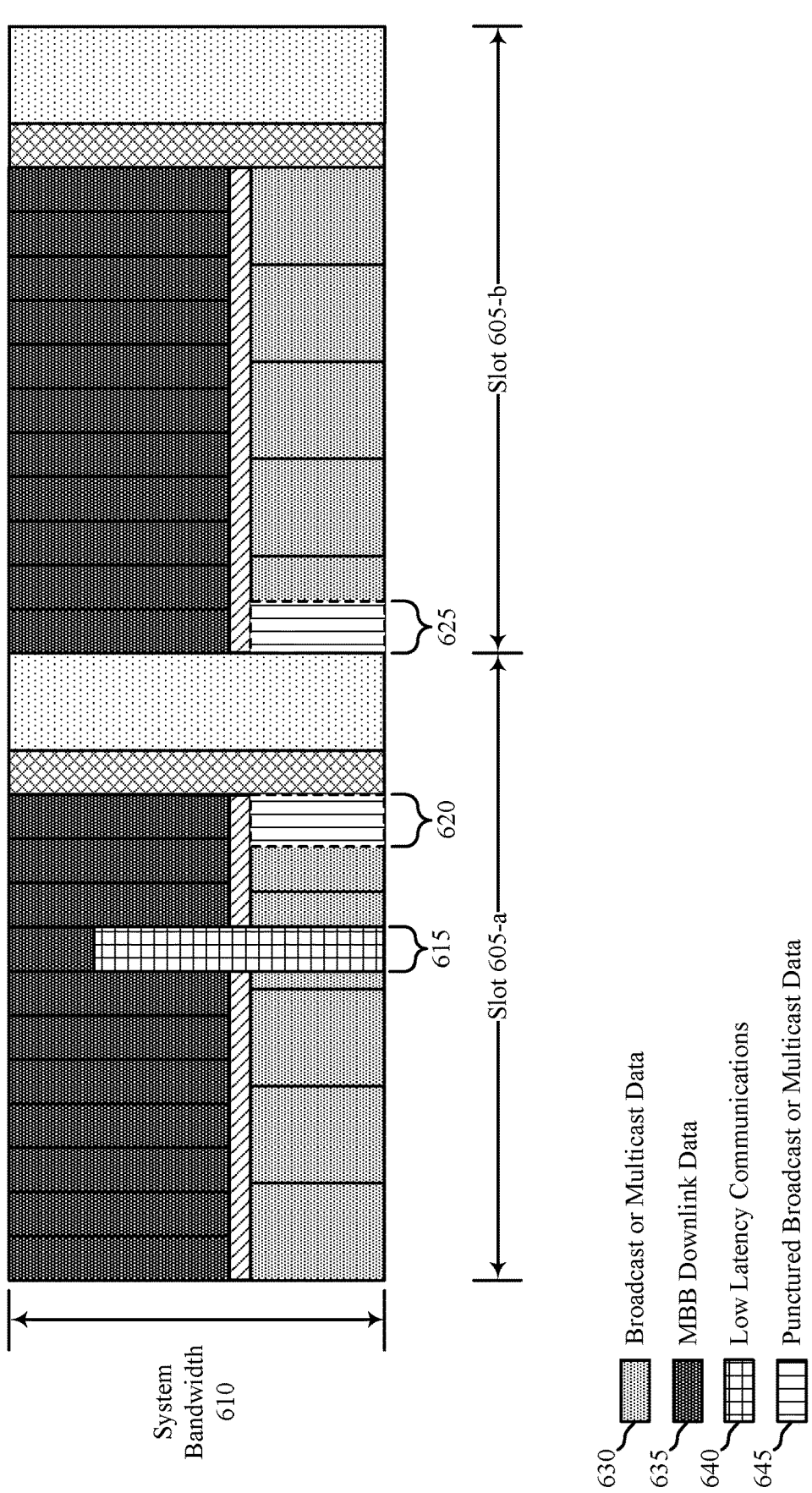

FIG. 6 illustrates an example of time intervals (e.g., slots) 600 allocated for MBB communications and broadcast or multicast data transmissions in accordance with various aspects of the present disclosure. In some wireless communications systems (e.g., NR systems), resources allocated for one type of communications may be interrupted by another type of communications. In the example of FIG. 6, a transmission of broadcast or multicast data 630 and a transmission of MBB downlink data 635 may be interrupted by low latency communications 640. That is, a portion of the system bandwidth 610 may be used (e.g., reassigned) during time period 615 for low latency communications 640. This bursty interference may result in a portion of the broadcast or multicast data 630 being lost.

As described herein, wireless communications systems may support efficient techniques for retransmitting punctured broadcast or multicast data 645. In an example, the base station may allocate a portion 620 of slot 605-a for an outer code to protect the transmission of the broadcast or multicast data 630 against bursty interface. The use of an outer code may help to reduce delays in broadcast communication (e.g., for live streaming) since the punctured broadcast or multicast data 645 is transmitted within the same slot that was punctured. Further, the amount of resources used for the outer code (e.g., overhead) may be allocated dynamically based on the amount of low latency communications 640 in a wireless communications system (e.g., an estimated low latency load with an included margin). In some cases, the portion of slot 605-a allocated for an outer code may be restricted to a predetermined duration and predetermined number of subcarriers.

In another example, a base station may identify that the broadcast or multicast data 630 has been punctured, and the base station may schedule a retransmission of the punctured broadcast or multicast data 645 in a portion 625 of a subsequent slot 605-b (e.g., the base station may mark and resend punctured code blocks). This technique may allow for reduced overhead. In yet another example, a portion of the punctured broadcast or multicast data 645 may be transmitted using an outer code and another portion of the punctured broadcast or multicast data 645 may be transmitted in a subsequent slot. In some cases, if broadcast or multicast control information is punctured in slot 605-a, a base station may retransmit the broadcast or multicast control information using the outer code in slot 605-a. And if broadcast or multicast data is punctured, the base station may retransmit the broadcast or multicast data in a subsequent slot. The retransmission of broadcast or multicast control information using an outer code may allow a base station to ensure that the control information used to decode the broadcast or multicast data in slot 605-a is available to a receiving UE within slot 605-a.

Figure 7:
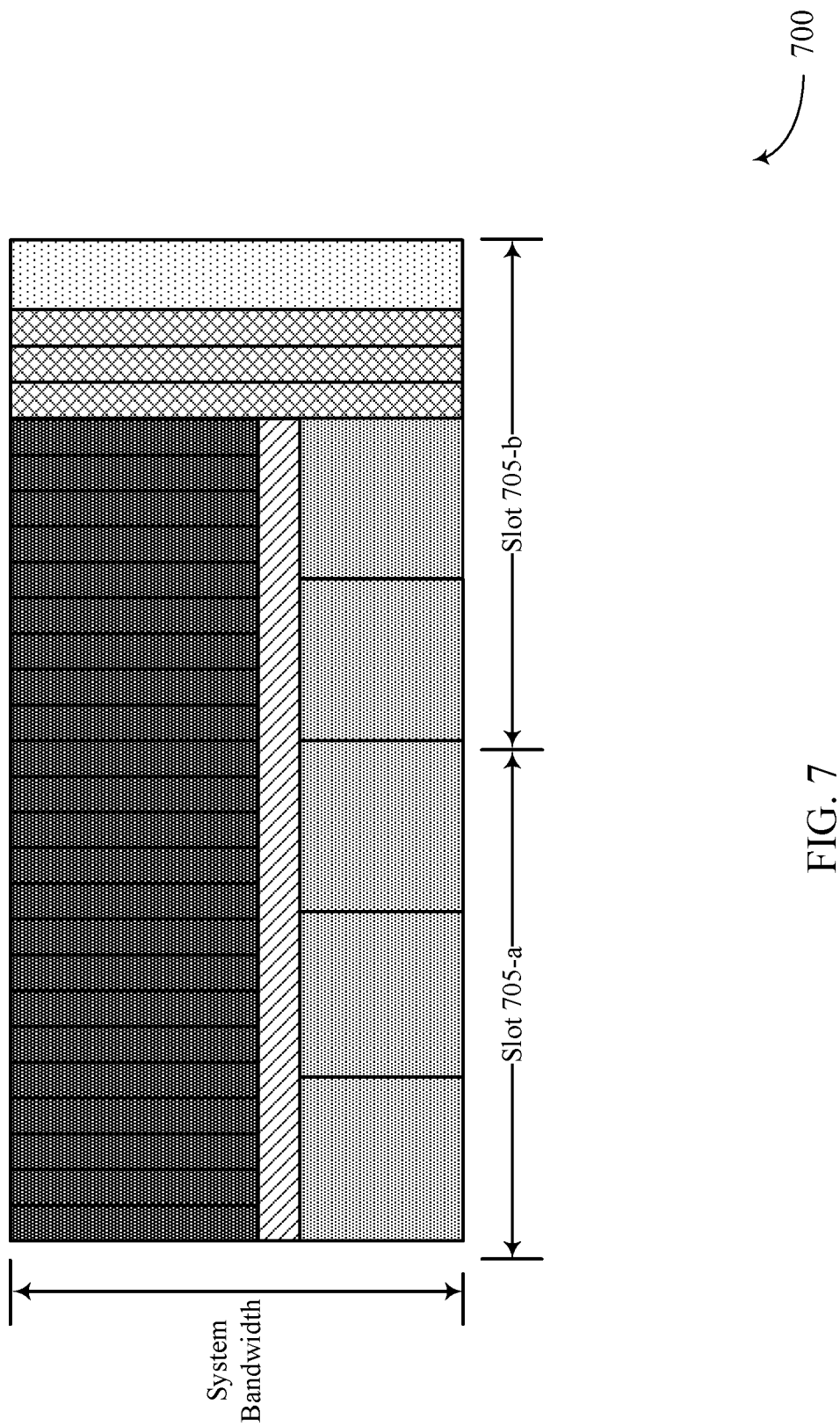

FIG. 7 illustrates an example of time intervals (e.g., slots) 700 allocated for MBB communications and broadcast or multicast data transmissions in accordance with various aspects of the present disclosure. As illustrated, slot 705-a and slot 705-b may be aggregated to form a longer downlink-centric slot. The use of multi-slot aggregation may allow base stations in an SFN to support longer CP durations and, as a result, larger cell sizes. For example, since UEs farther away from a group of base stations in an SFN may experience longer delays before receiving a transmission, transmissions from a base station during a first slot may potentially interfere with transmissions from another base station during a subsequent slot, even if the base stations are synchronized. The use of longer CP durations allows for additional overlap between such transmissions to limit interference across slots. Thus, the SFN may support broadcast or multicast communications with additional UEs farther away from the base stations in the SFN (i.e., a larger cell size).

In an example, the aggregation of two (2) slots with three (3) symbols used as a guard period and two (2) symbols used for uplink communication may support a CP duration of up to 155.5 µs, 100,960 downlink samples, and a 15 km cell radius. Table 3 below illustrates example configurations of two (2) slots used for the transmission of broadcast or multicast data.

TABLE 3

Exemplary slot configurations for broadcast or multicast data

| FFT Size | SCS | CP Size | CP Duration/s | Number of Symbols per 2 Slots | % CP of Symbol |
|---|---|---|---|---|---|
| 4096 | 30000 | 952 | 7.75E−06 | 20 | 23% |
| 8192 | 15000 | 1904 | 1.55E−05 | 10 | 23% |
| 16384 | 7500 | 3808 | 3.10E−05 | 5 | 23% |
| 81920 | 1500 | 19040 | 1.55E−04 | 1 | 23% |

In another example, the aggregation of three (3) slots with three (3) symbols used as a guard period and two (2) symbols used for uplink communication may support a CP duration of up to 255 µs and 162,400 downlink samples. Table 4 below illustrates example configurations of three (3) slots used for the transmission of broadcast or multicast data.

TABLE 4

Exemplary slot configurations for broadcast or multicast data

| FFT Size | SCS | CP Size | CP Duration/s | Number of Symbols per 2 Slots | % CP of Symbol |
|---|---|---|---|---|---|
| 4096 | 30000 | 979 | 7.97E−06 | 32 | 24% |
| 8192 | 15000 | 1958 | 1.59E−05 | 16 | 24% |
| 16384 | 7500 | 3916 | 3.19E−05 | 8 | 24% |
| 32768 | 3750 | 7832 | 6.37E−05 | 4 | 24% |
| 65536 | 1875 | 15664 | 1.27E−04 | 2 | 24% |
| 131072 | 937.5 | 31328 | 2.55E−04 | 1 | 24% |

As described in the examples above, the use of a longer CP duration may allow base stations in an SFN to support larger cell sizes. The use of multi-slot aggregation may facilitate longer CP durations, which may allow a base station to support urban and rural case deployments. In an example, an indoor portable or dense urban deployment was tested with inter-site distances of 1-5 km between base stations, a large penetration loss (e.g., 11 dB), and a typical antenna gain for a handset antenna (e.g., −7.35 dBi omnidirectional gain). In another example, a fixed rooftop or rural deployment was tested with larger inter-site distances of 7-15 km, an active gain antenna at a UE (e.g., 13.15 dBi directional with 3 dB at 60 deg), and a rooftop receiver at the UE (e.g., 10 m height). The analysis showed that 95% of the coverage was achieved with a 200 µs CP duration at the largest inter-site distance of 15 km with a signal-to-noise ratio (SNR) of approximately 17 dB. The aggregation of two (2) slots described above may, in some examples, be able to support this use case (e.g., using an FDM partition with a 1.25 kHz subcarrier spacing).

Figure 8:
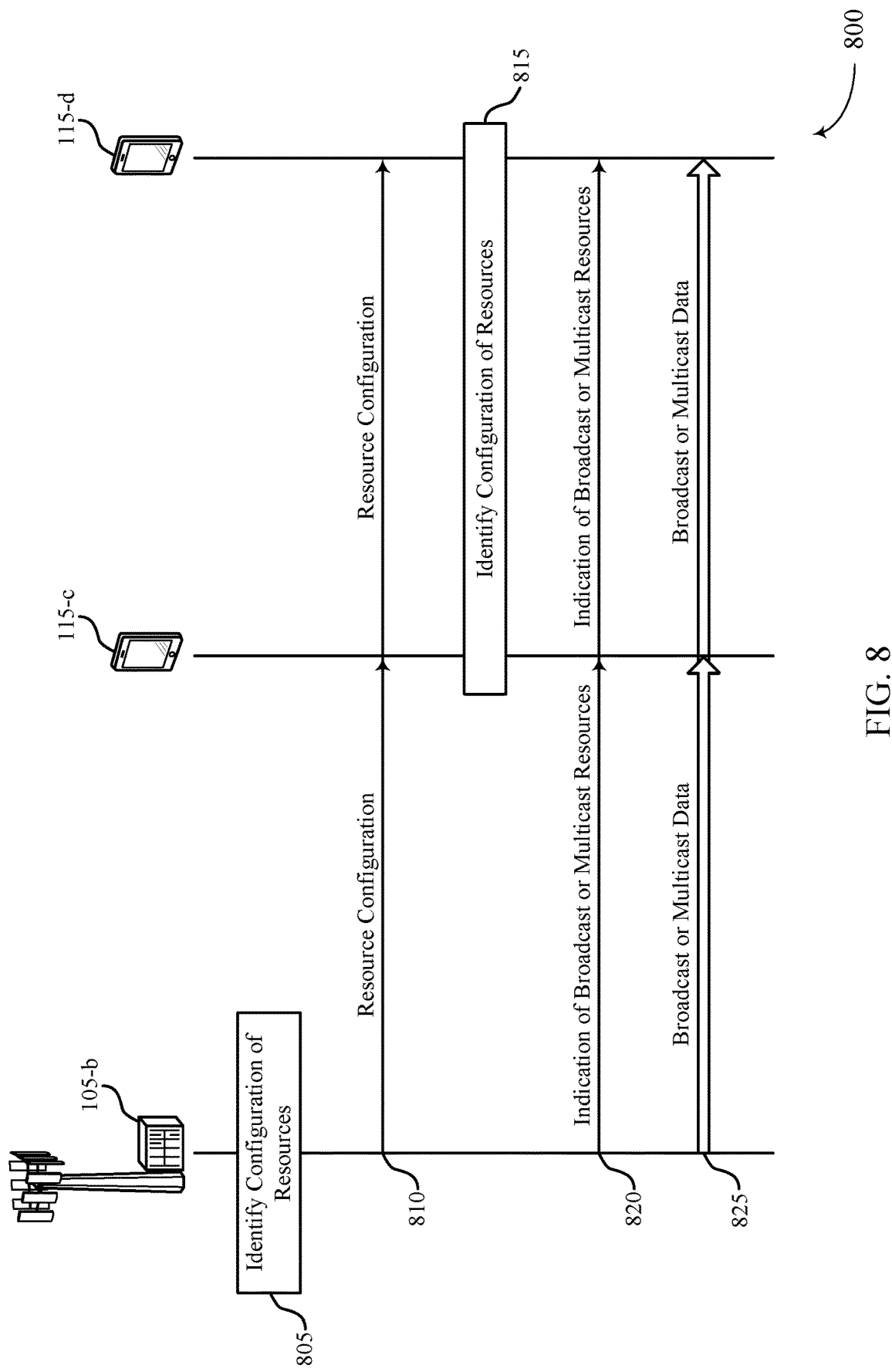
FIG. 8 illustrates an example of a process flow that supports a broadcast or multicast physical layer configuration and channel structure in accordance with various aspects of the present disclosure.

FIG. 8 illustrates an example of a process flow 800 that supports a broadcast or multicast physical layer configuration and channel structure in accordance with various aspects of the present disclosure. Process flow 800 illustrates aspects of techniques performed by a base station 105-b, which may be an example of a base station 105 described with reference to FIGS. 1-7. Process flow 800 also illustrates aspects of techniques performed by a UE 115-c and a UE 115-d, which may be examples of a UE 115 described with reference to FIGS. 1-7.

At 805, base station 105-b may identify a configuration of resources to be used for communicating with UEs 115 in a wireless communications system. For example, base station 105-b may identify a first configuration (e.g., a downlink configuration) of a first set of resources for broadcast or multicast data and a second configuration (e.g., an uplink configuration) of a second set of resources for uplink transmissions. At 810, base station 105-*b* may transmit an indication of the first configuration of the first set of resources and the second configuration of the second set of resources. In some cases, base station 105-*b* may transmit radio resource control (RRC) signaling that indicates the first configuration of the first set of resources and the second configuration of the second set of resources. In other cases, base station 105-*b* may transmit a downlink control message that indicates the first configuration of the first set of resources and the second configuration of the second set of resources. In yet other cases, base station 105-*b* may transmit either RRC signaling or a downlink control message that indicates the first configuration of the first set of resources, and the second configuration of the second set of resources may be identified based on the first configuration of the first set of resources.

At 815, UE 115-*c* and UE 115-*d* may identify a configuration of resources to be used for communicating with base station 105-*b* based on the resource configuration received at 810. For example, UE 115-*c* may identify the first configuration of the first set of resources and the second configuration of the second set of resources. At 820, base station 105-*b* may transmit an indication of resources for broadcast or multicast data (e.g., resources configured for downlink communication). For example, base station 105-*b* may transmit an indication of the first set of resources for broadcast or multicast data based on the first configuration (e.g., downlink configuration), where the first set of resources may be time division multiplexed with the second set of resources associated with the second configuration (e.g., uplink configuration). In some cases, the first set of resources may include time resources of a downlink slot and the second set of resources may include time resources of an uplink slot. In other cases, the first set of resources may include an aggregated set of two or more downlink-centric slots.

In some cases, base station 105-*b* may identify a first portion of a system bandwidth allocated for broadcast or multicast data that is frequency division multiplexed with a second portion of the system bandwidth allocated for MBB communications (e.g., on time resources allocated for broadcast or multicast data). In such cases, base station 105-*b* may transmit an indication to UE 115-*c* and UE 115-*d* of the first portion of the system bandwidth allocated for broadcast or multicast data and the second portion of the system bandwidth allocated for MBB communications. The broadcast or multicast resource indication (e.g., transmitted at 820) and the broadcast or multicast bandwidth indication (not shown) may be transmitted on a PDCCH or MCCH.

At 825, base station 105-*b* may transmit broadcast or multicast data to UE 115-*c* and UE 115-*d* based on the broadcast or multicast resource indication. In some cases, the transmission of broadcast or multicast data corresponds to an SFN transmission. In such cases, the broadcast or multicast data may be transmitted during a first downlink slot on a portion of a system bandwidth and other broadcast or multicast data may be transmitted during a subsequent downlink slot on the portion of the system bandwidth (i.e., the same portion of the system bandwidth). In other cases, the transmission of broadcast or multicast data may correspond to an SC-PTM transmission. In such cases, the SC-PTM transmission may be transmitted during a time interval on a first portion of a system bandwidth, and another SC-PTM transmission may be transmitted during a subsequent time interval on a second portion of the system bandwidth (i.e., a same or different portion of the system bandwidth).

In some examples, a first number of subcarriers of the first portion of the system bandwidth and a second number of subcarriers of the second portion of the system bandwidth may be less than a predetermined number of subcarriers of the system bandwidth. That is, the number of subcarriers used for the transmission of the broadcast or multicast data may be restricted. Base station 105-*b* may transmit the broadcast or multicast data on a PDSCH or on an MTCH. In some cases, the broadcast or multicast data may be transmitted based on a DTX cycle. In such cases, UE 115-*c* and UE 115-*d* may be configured to operate according to a DRX cycle, and these UEs may receive the broadcast or multicast data based on the DRX cycle.

As described with reference to FIG. 6, base station 105-*b*, UE 115-*c*, and UE 115-*d* may identify a reassignment of a portion of the first set of resources during a time interval for another type of communications. In some examples, base station 105-*b* may transmit data configured with an outer code in a subsequent portion of the time interval based at least in part on identifying the reassignment, where the data configured with the outer code includes broadcast or multicast data punctured by the other type of communications. In other examples, base station 105-*b* may transmit data in a subsequent time interval based at least in part on identifying the reassignment, where the data transmitted in the subsequent time interval includes broadcast or multicast data punctured by the other type of communications.

In yet other examples, base station 105-*b* may transmit a first portion of data configured with an outer code in a subsequent portion of the time interval based on identifying the reassignment, where the first portion of data configured with the outer code includes a first portion of broadcast or multicast data punctured by the other type of communications. And base station 105-*b* may transmit a second portion of data in a subsequent time interval based at least in part on identifying the reassignment, where the second portion of data transmitted in the subsequent time interval includes a second portion of broadcast or multicast data punctured by the other type of communications.

Figure 9:
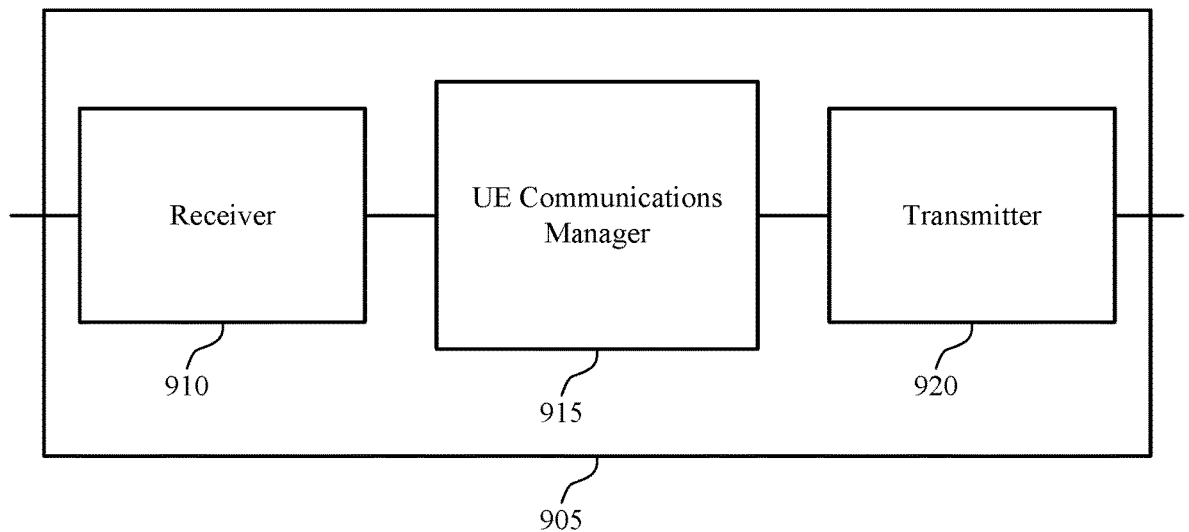
FIGS. 9-11 show block diagrams of a device or devices that support a broadcast or multicast physical layer configuration and channel structure in accordance with various aspects of the present disclosure.

FIG. 9 shows a block diagram 900 of a wireless device 905 that supports a broadcast or multicast physical layer configuration and channel structure in accordance with aspects of the present disclosure. Wireless device 905 may be an example of aspects of a UE 115 as described with reference to FIG. 1. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to a broadcast or multicast physical layer configuration and channel structure, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12. UE communications manager 915 or at least some of its various sub-components may be implemented in hardware, software executed by a processor, firmware, or any combination thereof. If implemented in software executed by a processor, the functions of the UE communications manager 915 or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 915 or at least some of its various sub-components may be physically located at various positions, including being distributed such that portions of functions are implemented at different physical locations by one or more physical devices. In some examples, UE communications manager 915 or at least some of its various sub-components may be a separate and distinct component in accordance with various aspects of the present disclosure. In other examples, UE communications manager 915 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may, in combination with receiver 910, receive an indication of a set of resources allocated for downlink transmissions. UE communications manager 915 may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. UE communications manager 915 may, in combination with receiver 910, receive broadcast or multicast data on the first portion of the system bandwidth on the set of resources based on the identifying.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
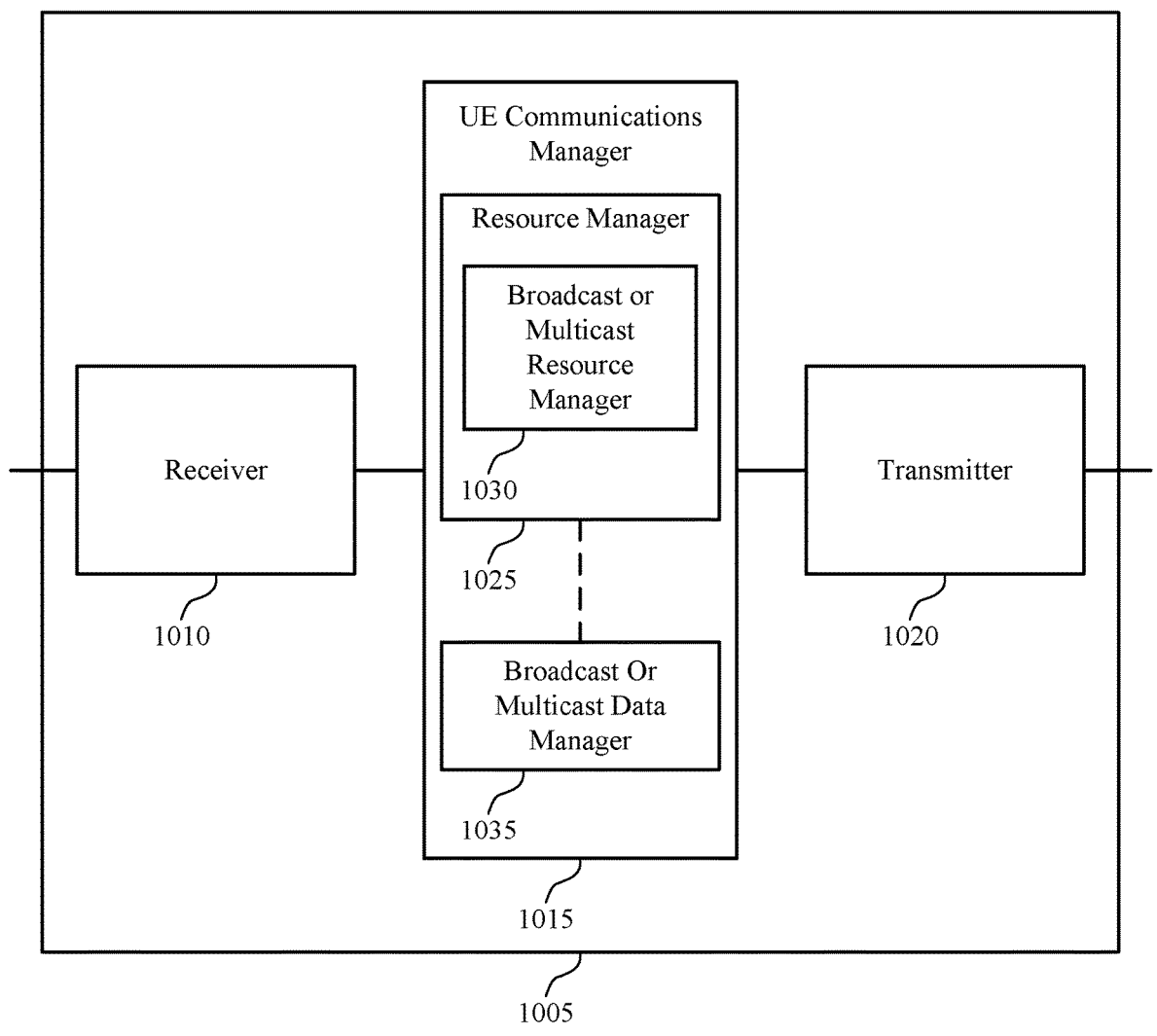

FIG. 10 shows a block diagram 1000 of a wireless device 1005 that supports a broadcast or multicast physical layer configuration and channel structure in accordance with aspects of the present disclosure. Wireless device 1005 may be an example of aspects of a wireless device 905 or a UE 115 as described with reference to FIGS. 1 and 9. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to a broadcast or multicast physical layer configuration and channel structure, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may include resource manager 1025, broadcast or multicast resource manager 1030, and broadcast or multicast data manager 1035.

Resource manager 1025 may receive an indication of a set of resources allocated for downlink transmissions. In some cases, the indication of the set of resources allocated for downlink transmissions further identifies another set of resources allocated for uplink transmissions that is time division multiplexed with the set of resources allocated for downlink transmissions. In some cases, the indication is received in RRC signaling. In some cases, the indication is received in a downlink control message in a PDCCH. In some cases, the set of resources allocated for downlink transmissions comprises time resources of one or more downlink slots and the other set of resources allocated for uplink transmissions comprises time resources of one or more uplink slots. In some cases, the set of resources comprises an aggregated set of two or more downlink-centric slots.

Resource manager 1025 may include broadcast or multicast resource manager 1030 which may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. Broadcast or multicast data manager 1035 may receive broadcast or multicast data on the first portion of the system bandwidth on the set of resources based at least in part on the identifying. In some cases, the broadcast or multicast data is received during a first downlink slot on the first portion of the system bandwidth and other broadcast or multicast data is received during a subsequent downlink slot on the first portion of the system bandwidth. In some cases, the broadcast or multicast data is received on an MTCH or a PDSCH.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
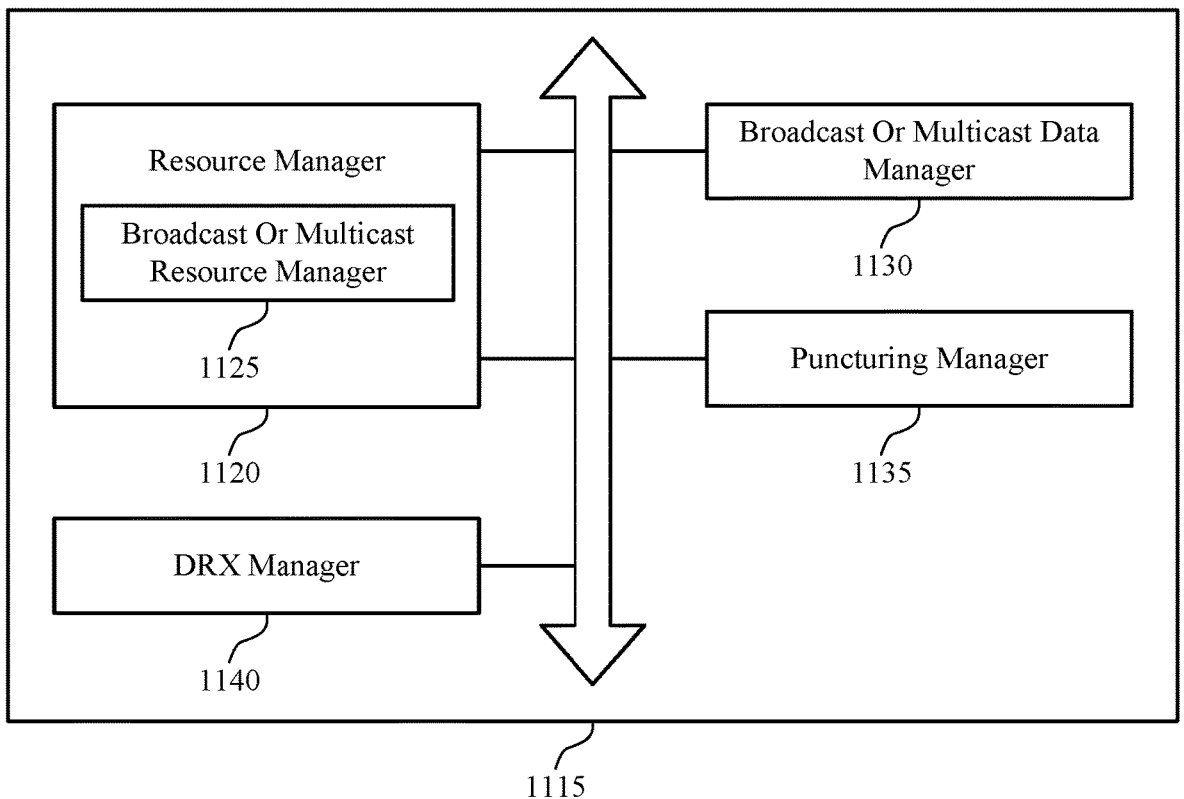

FIG. 11 shows a block diagram 1100 of a UE communications manager 1115 that supports a broadcast or multicast physical layer configuration and channel structure in accordance with aspects of the present disclosure. The UE communications manager 1115 may be an example of aspects of a UE communications manager 915, a UE communications manager 1015, or a UE communications manager 1215 described with reference to FIGS. 9, 10, and 12. The UE communications manager 1115 may include resource manager 1120, broadcast or multicast resource manager 1125, broadcast or multicast data manager 1130, puncturing manager 1135, and DRX manager 1140. Each of these modules may communicate, directly or indirectly, with one another (e.g., via one or more buses).

Resource manager 1120 may receive an indication of a set of resources allocated for downlink transmissions. In some cases, the indication of the set of resources allocated for downlink transmissions further identifies another set of resources allocated for uplink transmissions that is time division multiplexed with the set of resources allocated for downlink transmissions. In some cases, the indication is received in RRC signaling. In some cases, the indication is received in a downlink control message in a PDCCH. In some cases, the set of resources allocated for downlink transmissions comprises time resources of one or more downlink slots and the other set of resources allocated for uplink transmissions comprises time resources of one or more uplink slots. In some cases, the set of resources comprises an aggregated set of two or more downlink-centric slots.

Resource manager 1120 may include broadcast or multi-cast resource manager 1125 which may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. Broadcast or multicast data manager 1130 may receive broadcast or multicast data on the first portion of the system bandwidth on the set of resources based at least in part on the identifying. In some cases, the broadcast or multicast data is received during a first downlink slot on the first portion of the system bandwidth and other broadcast or multicast data is received during a subsequent downlink slot on the first portion of the system bandwidth. In some cases, the broadcast or multicast data is received on an MTCH or a PDSCH.

Puncturing manager 1135 may identify a reassignment of a portion of the set of resources during a time interval for another type of communications. In some cases, puncturing manager 1135 may receive data configured with an outer code in a subsequent portion of the time interval based on identifying the reassignment, where the data configured with the outer code includes broadcast or multicast data punctured by the other type of communications. In some cases, puncturing manager 1135 may receive data in a subsequent time interval based on identifying the reassignment, where the data received in the subsequent time interval includes broadcast or multicast data punctured by the other type of communications.

In some cases, puncturing manager 1135 may receive a first portion of data configured with an outer code in a subsequent portion of the time interval based on identifying the reassignment, where the first portion of data configured with the outer code includes a first portion of broadcast or multicast data punctured by the other type of communications, and receive a second portion of data in a subsequent time interval based on identifying the reassignment, where the second portion of data received in the subsequent time interval includes a second portion of broadcast or multicast data punctured by the other type of communications. DRX manager 1140 may identify parameters for a DRX cycle used to receive the broadcast or multicast data.

Figure 12:
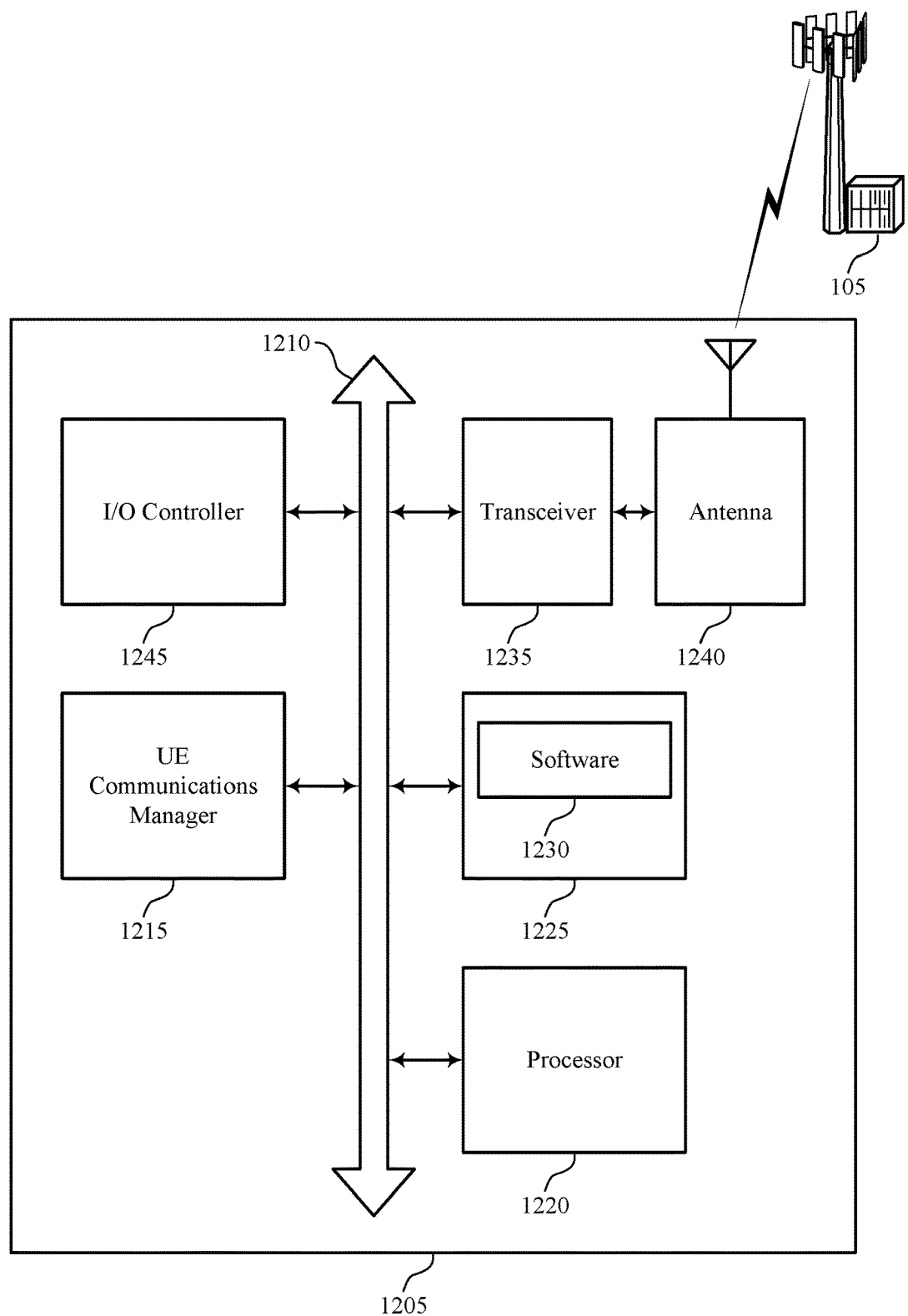
FIG. 12 illustrates a block diagram of a system including a device that supports a broadcast or multicast physical layer configuration and channel structure in accordance with various aspects of the present disclosure.

FIG. 12 shows a diagram of a system 1200 including a device 1205 that supports a broadcast or multicast physical layer configuration and channel structure in accordance with aspects of the present disclosure. Device 1205 may be an example of or include the components of wireless device 905, wireless device 1005, or a UE 115 as described above, e.g., with reference to FIGS. 1, 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting a broadcast or multicast physical layer configuration and channel structure).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support a broadcast or multicast physical layer configuration and channel structure. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases, the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
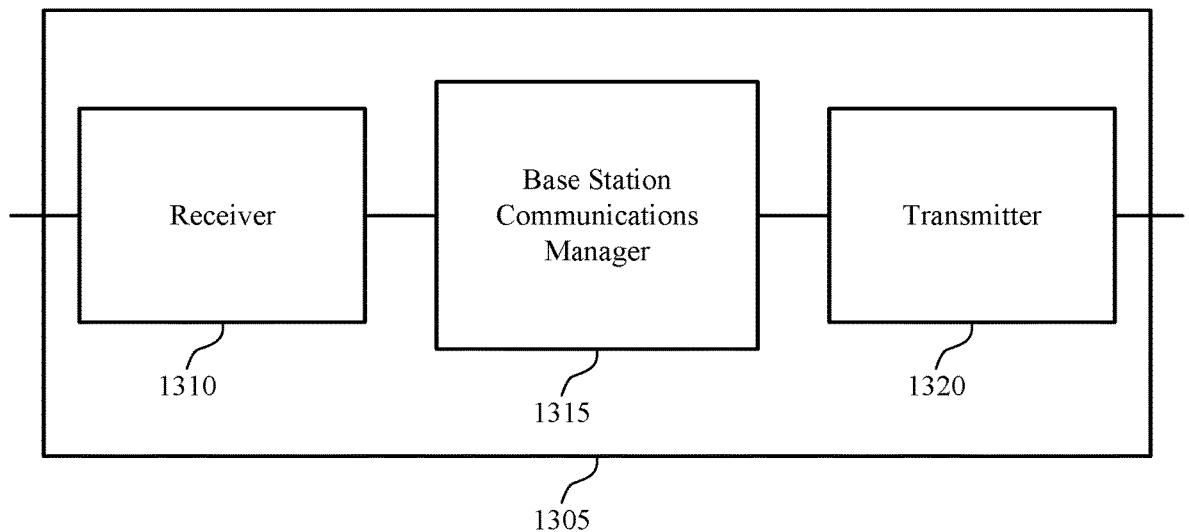
FIGS. 13-15 show block diagrams of a device or devices that support a broadcast or multicast physical layer configuration and channel structure in accordance with various aspects of the present disclosure.

FIG. 13 shows a block diagram 1300 of a wireless device 1305 that supports a broadcast or multicast physical layer configuration and channel structure in accordance with aspects of the present disclosure. Wireless device 1305 may be an example of aspects of a base station 105 as described with reference to FIG. 1. Wireless device 1305 may include receiver 1310, base station communications manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to a broadcast or multicast physical layer configuration and channel structure, etc.). Information may be passed on to other components of the device. The receiver 1310 may be an example of aspects of the transceiver 1635 described with reference to FIG. 16. The receiver 1310 may utilize a single antenna or a set of antennas.

Base station communications manager 1315 may be an example of aspects of the base station communications manager 1615 described with reference to FIG. 16. Base station communications manager 1315 or at least some of its various sub-components may be implemented in hardware, software executed by a processor, firmware, or any combination thereof. If implemented in software executed by a processor, the functions of the base station communications manager 1315 or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315 or at least some of its various sub-components may be physically located at various positions, including being distributed such that portions of functions are implemented at different physical locations by one or more physical devices. In some examples, base station communications manager 1315 or at least some of its various sub-components may be a separate and distinct component in accordance with various aspects of the present disclosure. In other examples, base station communications manager 1315 or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1315 may, in combination with transmitter 1320, transmit an indication of a set of resources allocated for downlink transmissions. Base station communications manager 1315 may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. Base station communications manager 1315 may, in combination with transmitter 1320, transmit broadcast or multicast data on the first portion of the system bandwidth on the set of resources based on the identifying.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may utilize a single antenna or a set of antennas.

Figure 14:
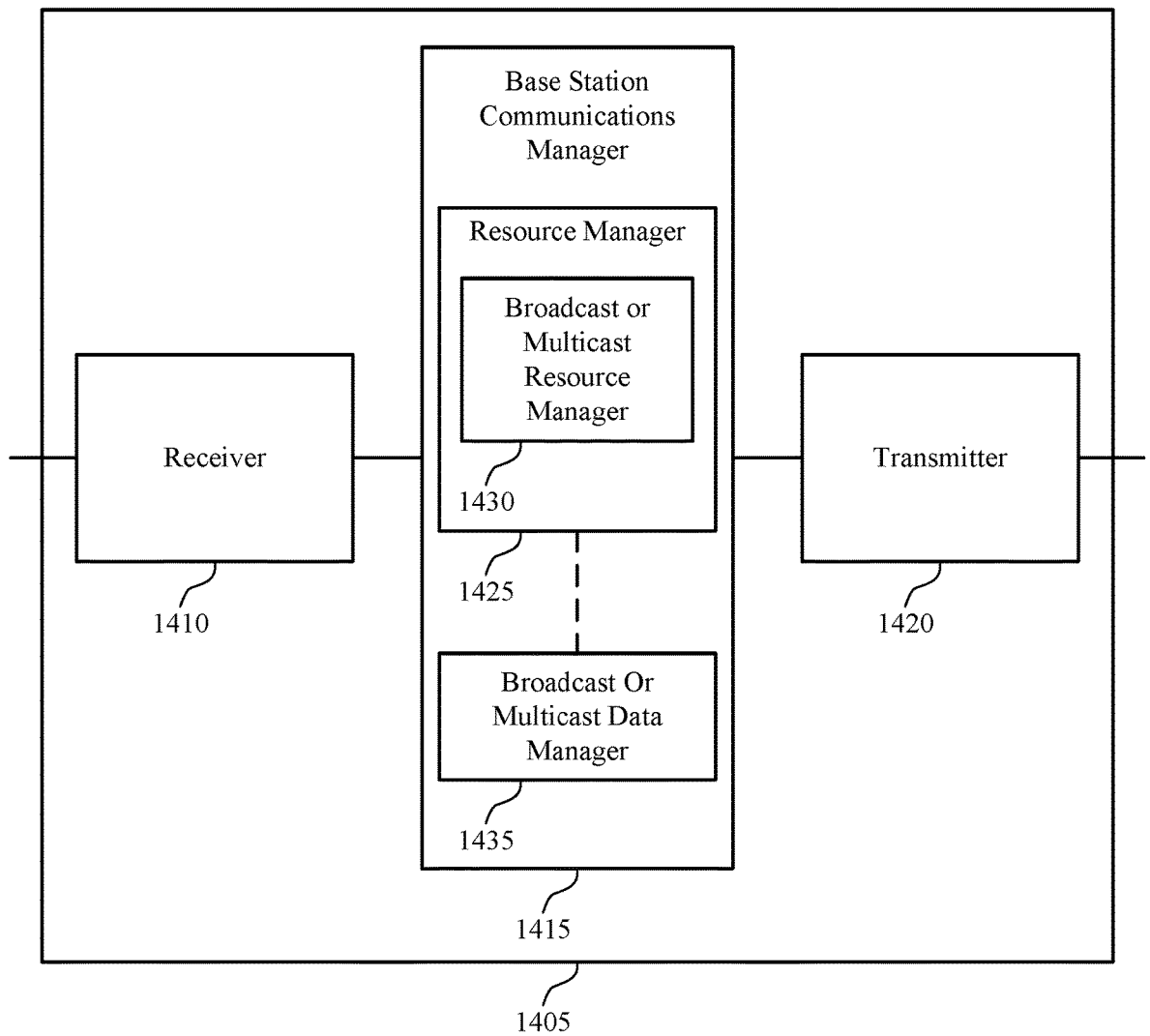

FIG. 14 shows a block diagram 1400 of a wireless device 1405 that supports a broadcast or multicast physical layer configuration and channel structure in accordance with aspects of the present disclosure. Wireless device 1405 may be an example of aspects of a wireless device 1305 or a base station 105 as described with reference to FIGS. 1 and 13. Wireless device 1405 may include receiver 1410, base station communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to a broadcast or multicast physical layer configuration and channel structure, etc.). Information may be passed on to other components of the device. The receiver 1410 may be an example of aspects of the transceiver 1635 described with reference to FIG. 16. The receiver 1410 may utilize a single antenna or a set of antennas.

Base station communications manager 1415 may be an example of aspects of the base station communications manager 1615 described with reference to FIG. 16. Base station communications manager 1415 may include resource manager 1425, broadcast or multicast resource manager 1430, and broadcast or multicast data manager 1435.

Resource manager 1425 may transmit an indication of a set of resources allocated for downlink transmissions. In some cases, the indication of the set of resources allocated for downlink transmissions further identifies another set of resources allocated for uplink transmissions that is time division multiplexed with the set of resources allocated for downlink transmissions. In some cases, the indication is transmitted in RRC signaling. In some cases, the indication is transmitted in a downlink control message in a PDCCH. In some cases, the set of resources allocated for downlink transmissions comprises time resources of one or more downlink slots and the other set of resources allocated for uplink transmissions comprises time resources of one or more uplink slots. In some cases, the set of resources comprises an aggregated set of two or more downlink-centric slots.

Resource manager 1425 may include broadcast or multicast resource manager 1430 which may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. Broadcast or multicast data manager 1435 may transmit broadcast or multicast data on the first portion of the system bandwidth on the set of resources as part of an SFN transmission based at least in part on the identifying. In some cases, the broadcast or multicast data is transmitted during a first downlink slot on the first portion of the system bandwidth and other broadcast or multicast data is transmitted during a subsequent downlink slot on the first portion of the system bandwidth. In some cases, the broadcast or multicast data is transmitted on an MTCH or a PDSCH.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may utilize a single antenna or a set of antennas.

Figure 15:
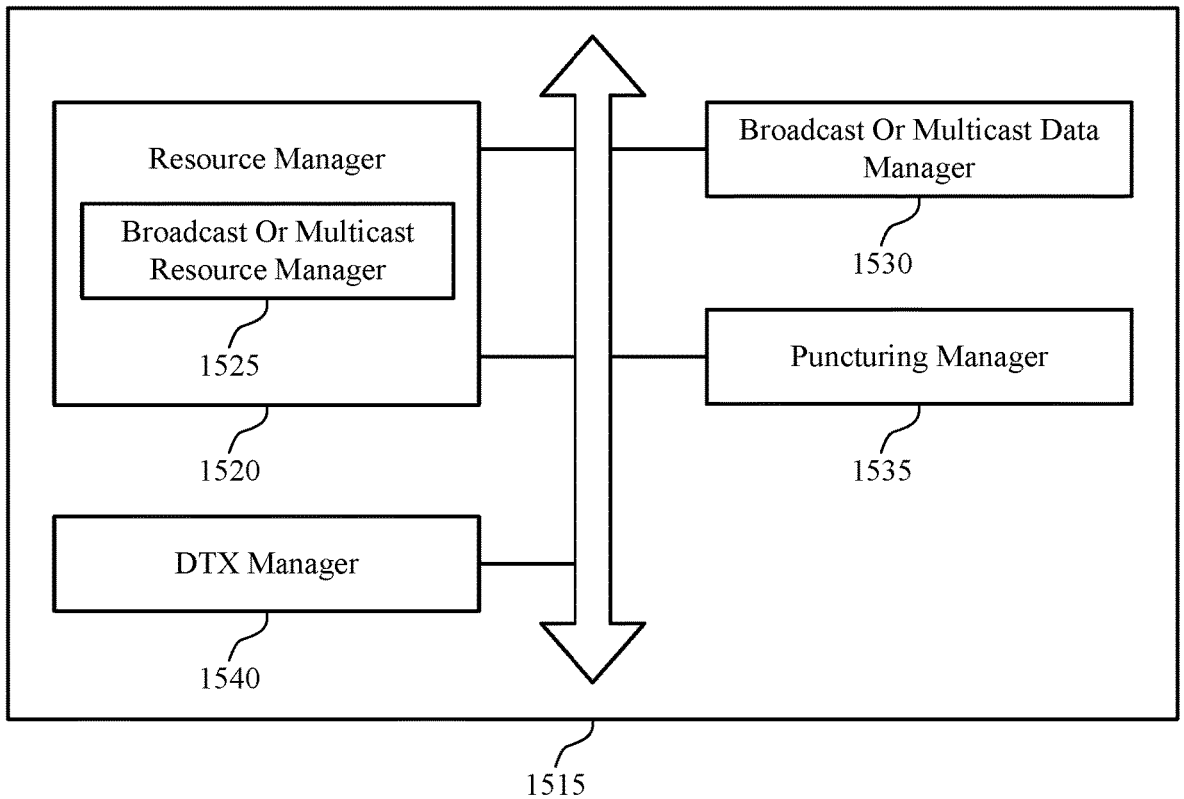

FIG. 15 shows a block diagram 1500 of a base station communications manager 1515 that supports a broadcast or multicast physical layer configuration and channel structure in accordance with aspects of the present disclosure. The base station communications manager 1515 may be an example of aspects of a base station communications manager 1615 described with reference to FIGS. 13, 14, and 16. The base station communications manager 1515 may include resource manager 1520, broadcast or multicast resource manager 1525, broadcast or multicast data manager 1530, puncturing manager 1535, and DTX manager 1540. Each of these modules may communicate, directly or indirectly, with one another (e.g., via one or more buses).

Resource manager 1520 may transmit an indication of a set of resources allocated for downlink transmissions. In some cases, the indication of the set of resources allocated for downlink transmissions further identifies another set of resources allocated for uplink transmissions that is time division multiplexed with the set of resources allocated for downlink transmissions. In some cases, the indication is transmitted in RRC signaling. In some cases, the indication is transmitted in a downlink control message in a PDCCH. In some cases, the set of resources allocated for downlink transmissions comprises time resources of one or more downlink slots and the other set of resources allocated for uplink transmissions comprises time resources of one or more uplink slots. In some cases, the set of resources comprises an aggregated set of two or more downlink-centric slots.

Resource manager 1520 may include broadcast or multicast resource manager 1525 which may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. Broadcast or multicast data manager 1530 may transmit broadcast or multicast data on the first portion of the system bandwidth on the set of resources as part of an SFN transmission based at least in part on the identifying. In some cases, the broadcast or multicast data is transmitted during a first downlink slot on the first portion of the system bandwidth and other broadcast or multicast data is transmitted during a subsequent downlink slot on the first portion of the system bandwidth. In some cases, the broadcast or multicast data is transmitted on an MTCH or a PDSCH.

Puncturing manager 1535 may identify a reassignment of a portion of the set of resources during a time interval for another type of communications. In some cases, puncturing manager 1535 may transmit data configured with an outer code in a subsequent portion of the time interval based on identifying the reassignment, where the data configured with the outer code includes broadcast or multicast data punctured by the other type of communications. In some cases, puncturing manager 1535 may transmit data in a subsequent time interval based on identifying the reassignment, where the data transmitted in the subsequent time interval includes broadcast or multicast data punctured by the other type of communications.

In some cases, puncturing manager 1535 may transmit a first portion of data configured with an outer code in a subsequent portion of the time interval based on identifying the reassignment, where the first portion of data configured with the outer code includes a first portion of broadcast or multicast data punctured by the other type of communications, and transmit a second portion of data in a subsequent time interval based on identifying the reassignment, where the second portion of data transmitted in the subsequent time interval includes a second portion of broadcast or multicast data punctured by the other type of communications. In some cases, DTX manager 1540 may identify parameters for a DTX cycle and may ensure that the broadcast or multicast data is transmitted based on the DTX cycle.

Figure 16:
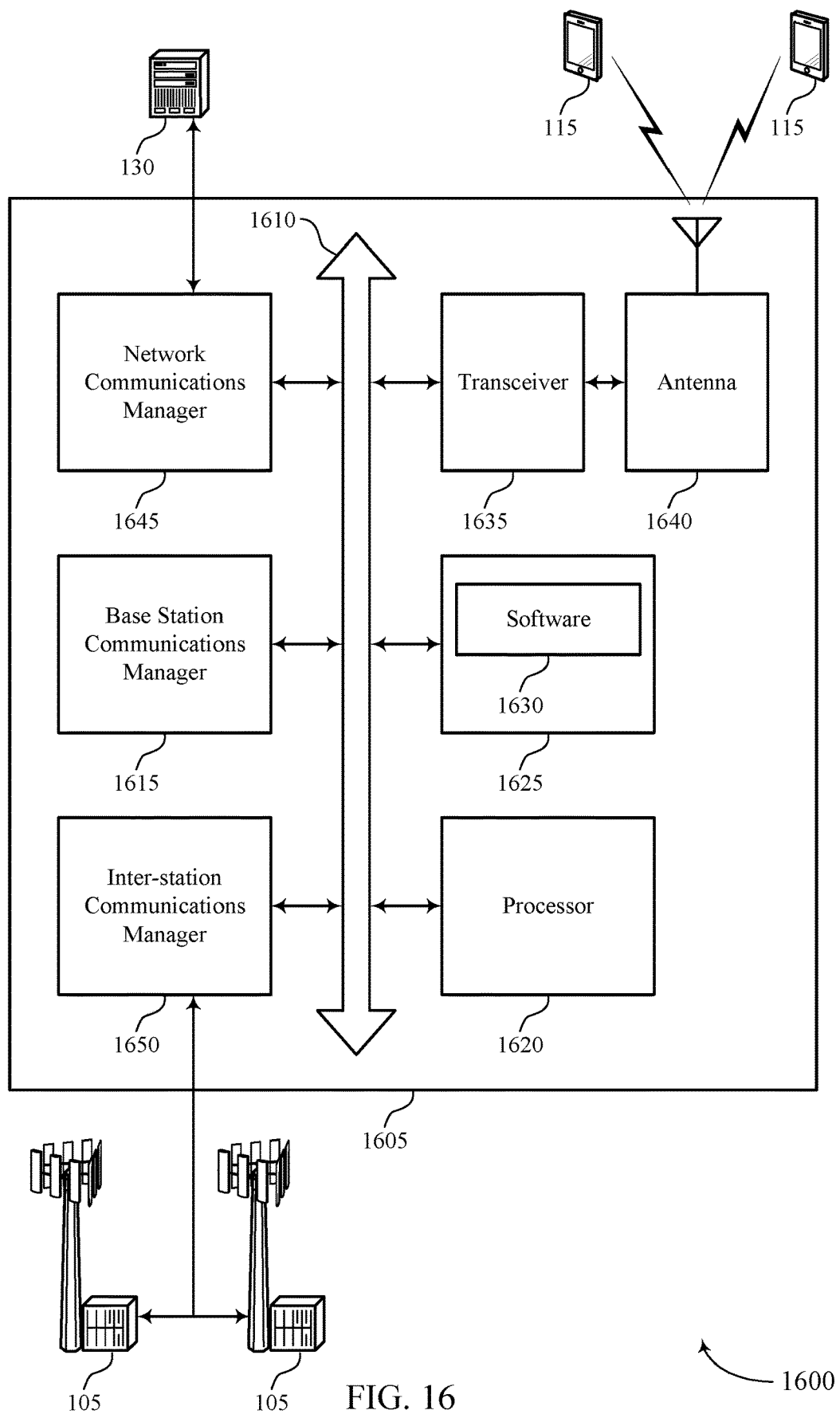
FIG. 16 illustrates a block diagram of a system including a device, such as a base station, that supports a broadcast or multicast physical layer configuration and channel structure in accordance with various aspects of the present disclosure.

FIG. 16 shows a diagram of a system 1600 including a device 1605 that supports a broadcast or multicast physical layer configuration and channel structure in accordance with aspects of the present disclosure. Device 1605 may be an example of or include the components of base station 105 as described above, e.g., with reference to FIG. 1. Device 1605 may include components for bi-directional voice and data communications including components for transmitting and receiving communications, including base station communications manager 1615, processor 1620, memory 1625, software 1630, transceiver 1635, antenna 1640, network communications manager 1645, and inter-station communications manager 1650. These components may be in electronic communication via one or more busses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting broadcast or multicast physical layer configuration and channel structure).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support a broadcast or multicast physical layer configuration and channel structure. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases, the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Inter-station communications manager 1650 may manage communications with other base station 105, and may include a controller or scheduler for controlling communications with UEs 115 in cooperation with other base stations 105. For example, the inter-station communications manager 1650 may coordinate scheduling for transmissions to UEs 115 for various interference mitigation techniques such as beamforming or joint transmission. In some examples, inter-station communications manager 1650 may provide an X2 interface within an LTE/LTE-A wireless communications network to provide communications between base stations 105.

Figure 17:
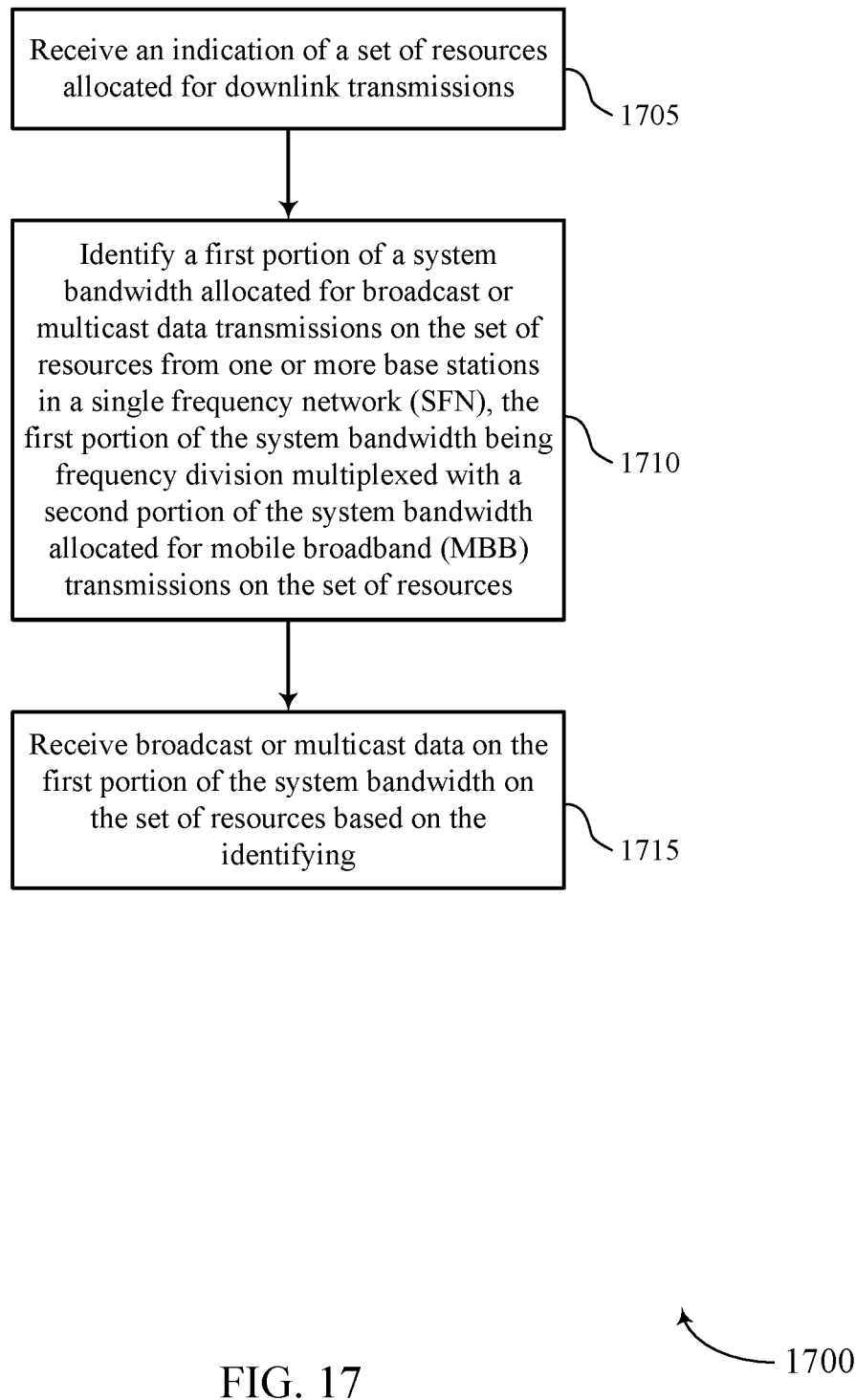
FIGS. 17 and 18 illustrate methods that support a broadcast or multicast physical layer configuration and channel structure in accordance with various aspects of the present disclosure.

FIG. 17 shows a flowchart illustrating a method 1700 that supports a broadcast or multicast physical layer configuration and channel structure in accordance with aspects of the present disclosure. The operations of method 1700 may be implemented by a UE 115 or its components as described herein. For example, the operations of method 1700 may be performed by a UE communications manager as described with reference to FIGS. 9-12. In some examples, a UE 115 may execute a set of codes to control the functional elements of the device to perform the functions described below. Additionally or alternatively, the UE 115 may perform aspects of the functions described below using special-purpose hardware.

At block 1705, the UE 115 may receive an indication of a set of resources allocated for downlink transmissions. The operations of block 1705 may be performed according to the methods described with reference to FIGS. 1-8. In certain examples, aspects of the operations of block 1705 may be performed by a resource manager as described with reference to FIGS. 9-12.

At block 1710, the UE 115 may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. The operations of block 1710 may be performed according to the methods described with reference to FIGS. 1-8. In certain examples, aspects of the operations of block 1710 may be performed by a broadcast or multicast resource manager as described with reference to FIGS. 9-12.

At block 1715, the UE 115 may receive broadcast or multicast data on the first portion of the system bandwidth on the set of resources based at least in part on the identifying. The operations of block 1715 may be performed according to the methods described with reference to FIGS. 1-8. In certain examples, aspects of the operations of block 1715 may be performed by a broadcast or multicast data manager as described with reference to FIGS. 9-12.

Figure 18:
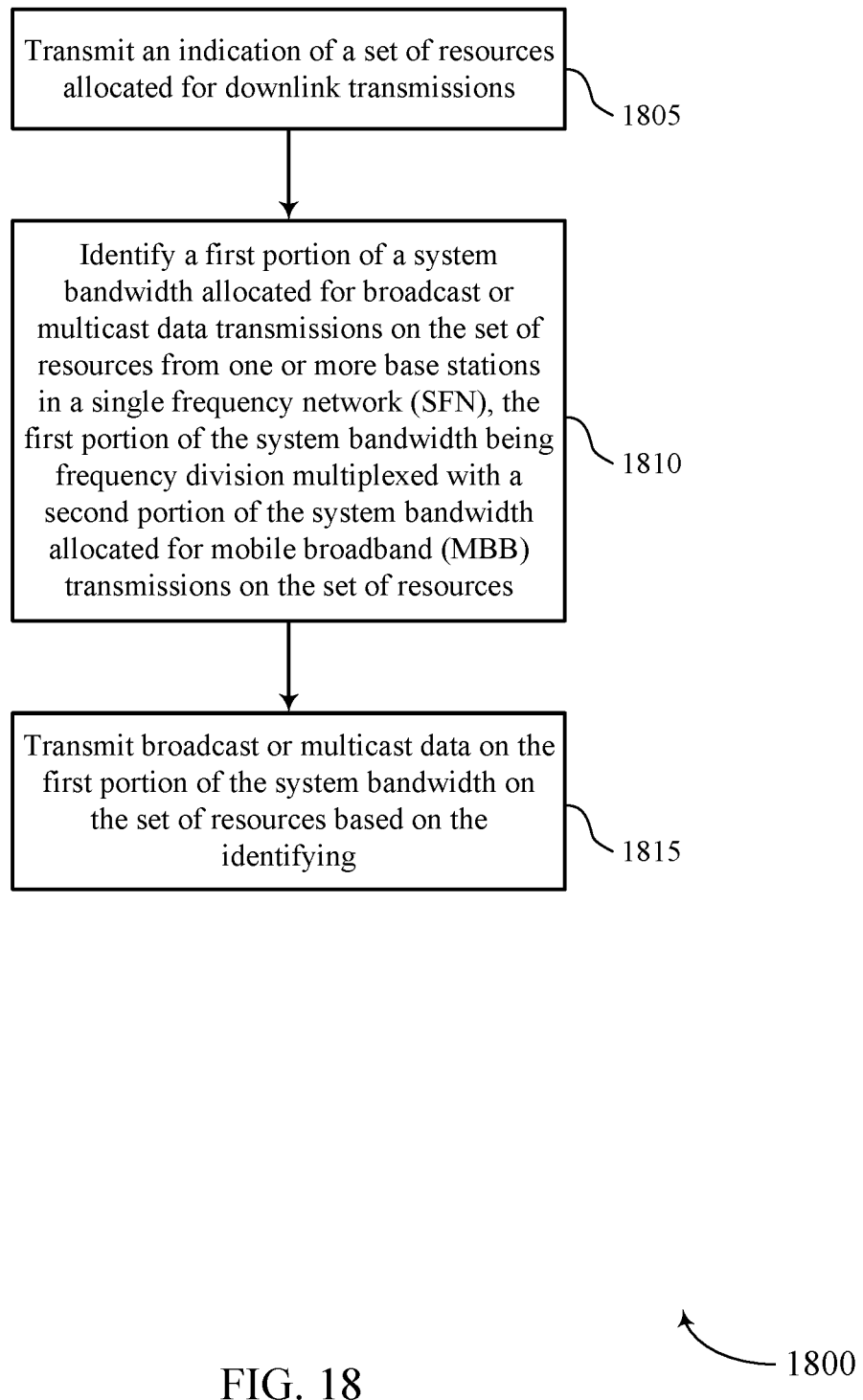

FIG. 18 shows a flowchart illustrating a method 1800 that supports a broadcast or multicast physical layer configuration and channel structure in accordance with aspects of the present disclosure. The operations of method 1800 may be implemented by a base station 105 or its components as described herein. For example, the operations of method 1800 may be performed by a base station communications manager as described with reference to FIGS. 13-16. In some examples, a base station 105 may execute a set of codes to control the functional elements of the device to perform the functions described below. Additionally or alternatively, the base station 105 may perform aspects of the functions described below using special-purpose hardware.

At block 1805, the base station 105 may transmit an indication of a set of resources allocated for downlink transmissions. The operations of block 1805 may be performed according to the methods described with reference to FIGS. 1-8. In certain examples, aspects of the operations of block 1805 may be performed by a resource manager as described with reference to FIGS. 13-16.

At block 1810, the base station 105 may identify a first portion of a system bandwidth allocated for broadcast or multicast data transmissions on the set of resources from one or more base stations in an SFN, the first portion of the system bandwidth being frequency division multiplexed with a second portion of the system bandwidth allocated for MBB transmissions on the set of resources. The operations of block 1810 may be performed according to the methods described with reference to FIGS. 1-8. In certain examples, aspects of the operations of block 1810 may be performed by a broadcast or multicast resource manager as described with reference to FIGS. 13-16.

At block 1815, the base station 105 may transmit broadcast or multicast data on the first portion of the system bandwidth on the set of resources based at least in part on the identifying. The operations of block 1815 may be performed according to the methods described with reference to FIGS. 1-8. In certain examples, aspects of the operations of block 1815 may be performed by a broadcast or multicast data manager as described with reference to FIGS. 13-16.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving an indication of a set of resources allocated for downlink transmissions;
   identifying a first portion of a system bandwidth allocated for broadcast or multicast data transmissions on the set of resources from one or more base stations in a single frequency network (SFN), the first portion of the system bandwidth being frequency division multiplexed with a second portion of the system bandwidth allocated for mobile broadband (MBB) transmissions on the set of resources, the first portion of the system bandwidth and the second portion of the system bandwidth having different and incompatible numerologies with subcarrier spacing of the first portion of the system bandwidth and subcarrier spacing of the second portion of the system bandwidth being non-integer multiples of one another;
   receiving broadcast or multicast data on the first portion of the system bandwidth on the set of resources based at least in part on the identifying;
   identifying a reassignment of a portion of the set of resources during a time interval for an other type of communications; and
   receiving data associated with a portion of the broadcast or multicast data punctured by the other type of communications in at least one of a subsequent portion of the time interval or a subsequent time interval based at least in part on the reassignment.

2. The method of claim 1, wherein the broadcast or multicast data is received during a first downlink slot on the first portion of the system bandwidth and other broadcast or multicast data is received during a subsequent downlink slot on the first portion of the system bandwidth.

3. The method of claim 1, wherein the indication of the set of resources allocated for downlink transmissions further identifies another set of resources allocated for uplink transmissions that is time division multiplexed with the set of resources allocated for downlink transmissions.

4. The method of claim 3, wherein the indication is received in radio resource control (RRC) signaling.

5. The method of claim 3, wherein the indication is received in a downlink control message in a physical downlink control channel (PDCCH).

6. The method of claim 3, wherein the set of resources allocated for downlink transmissions comprises time resources of one or more downlink slots and the other set of resources allocated for uplink transmissions comprises time resources of one or more uplink slots.

7. The method of claim 1, wherein receiving the data associated with the portion of the broadcast or multicast data punctured by the other type of communications comprises:
   receiving the data configured with an outer code in the subsequent portion of the time interval, wherein the data configured with the outer code corresponds to the portion of the broadcast or multicast data punctured by the other type of communications.

8. The method of claim 1, wherein receiving the data associated with the portion of the broadcast or multicast data punctured by the other type of communications comprises:
   receiving the data in the subsequent time interval, wherein the data received in the subsequent time interval comprises the portion of the broadcast or multicast data punctured by the other type of communications.

9. The method of claim 1, wherein receiving the data associated with the portion of the broadcast or multicast data punctured by the other type of communications comprises:
   receiving a first portion of the data configured with an outer code in the subsequent portion of the time interval, wherein the first portion of the data configured with the outer code corresponds to at least some of the portion of broadcast or multicast data punctured by the other type of communications; and
   receiving a second portion of the data in the subsequent time interval, wherein the second portion of the data received in the subsequent time interval comprises at least some of the portion of broadcast or multicast data punctured by the other type of communications.

10. The method of claim 1, wherein the set of resources comprises an aggregated set of two or more downlink-centric slots.

11. The method of claim 1, wherein the broadcast or multicast data is received on a multimedia broadcast multicast service (MBMS) traffic channel (MTCH) or a physical downlink shared channel (PDSCH).

12. The method of claim 1, wherein the broadcast or multicast data is received based at least in part on a discontinuous reception (DRX) cycle.

13. A method for wireless communication, comprising:
transmitting an indication of a set of resources allocated for downlink transmissions;
identifying a first portion of a system bandwidth allocated for broadcast or multicast data transmissions on the set of resources from one or more base stations in a single frequency network (SFN), the first portion of the system bandwidth being frequency division multiplexed with a second portion of the system bandwidth allocated for mobile broadband (MBB) transmissions on the set of resources, the first portion of the system bandwidth and the second portion of the system bandwidth having different and incompatible numerologies with subcarrier spacing of the first portion of the system bandwidth and subcarrier spacing of the second portion of the system bandwidth being non-integer multiples of one another;
transmitting broadcast or multicast data on the first portion of the system bandwidth on the set of resources as part of an SFN transmission based at least in part on the identifying;
identifying a reassignment of a portion of the set of resources during a time interval for an other type of communications; and
transmitting data associated with a portion of the broadcast or multicast data punctured by the other type of communications in in at least one of a subsequent portion of the time interval or a subsequent time interval based at least in part on the reassignment.

14. The method of claim 13, wherein the broadcast or multicast data is transmitted during a first downlink slot on the first portion of the system bandwidth and other broadcast or multicast data is transmitted during a subsequent downlink slot on the first portion of the system bandwidth.

15. The method of claim 13, wherein the indication of the set of resources allocated for downlink transmissions further identifies another set of resources allocated for uplink transmissions that is time division multiplexed with the set of resources allocated for downlink transmissions.

16. The method of claim 15, wherein the indication is transmitted in radio resource control (RRC) signaling.

17. The method of claim 15, wherein the indication is transmitted in a downlink control message in a physical downlink control channel (PDCCH).

18. The method of claim 15, wherein the set of resources allocated for downlink transmissions comprises time resources of one or more downlink slots and the other set of resources allocated for uplink transmissions comprises time resources of one or more uplink slots.

19. The method of claim 13, wherein transmitting the data associated with the portion of the broadcast or multicast data punctured by the other type of communications comprises:
transmitting the data configured with an outer code in the subsequent portion of the time interval, wherein the data configured with the outer code corresponds to the portion of the broadcast or multicast data punctured by the other type of communications.

20. The method of claim 13, wherein transmitting the data associated with the portion of the broadcast or multicast data punctured by the other type of communications comprises:
transmitting the data in the subsequent time interval, wherein the data received in the subsequent time interval comprises the portion of the broadcast or multicast data punctured by the other type of communications.

21. The method of claim 13, wherein transmitting the data associated with the portion of the broadcast or multicast data punctured by the other type of communications comprises:
transmitting a first portion of the data configured with an outer code in the subsequent portion of the time interval, wherein the first portion of the data configured with the outer code corresponds to at least some of the portion of broadcast or multicast data punctured by the other type of communications; and
transmitting a second portion of the data in the subsequent time interval, wherein the second portion of the data received in the subsequent time interval comprises at least some of the portion of broadcast or multicast data punctured by the other type of communications.

22. The method of claim 13, wherein the set of resources comprises an aggregated set of two or more downlink-centric slots.

23. The method of claim 13, wherein the broadcast or multicast data is transmitted on a multimedia broadcast multicast service (MBMS) traffic channel (MTCH) or a physical downlink shared channel (PDSCH).

24. The method of claim 13, wherein the broadcast or multicast data is transmitted based at least in part on a discontinuous transmission (DTX) cycle.

25. A mobile device for wireless communication, in a system comprising:
a processor;
memory coupled with the processor; and
instructions stored in the memory and operable, when executed by the processor, to cause the mobile device to:
receive an indication of a set of resources allocated for downlink transmissions;
identify a first portion of a system bandwidth allocated for broadcast or multicast data transmissions on the set of resources from one or more base stations in a single frequency network (SFN), the first portion of the system bandwidth being frequency division multiplexed with a second portion of the system bandwidth allocated for mobile broadband (MBB) transmissions on the set of resources, the first portion of the system bandwidth and the second portion of the system bandwidth having different and incompatible numerologies with subcarrier spacing of the first portion of the system bandwidth and subcarrier spacing of the second portion of the system bandwidth being non-integer multiples of one another;
receive broadcast or multicast data on the first portion of the system bandwidth on the set of resources based at least in part on the identifying;
identify a reassignment of a portion of the set of resources during a time interval for an other type of communications; and
receive data associated with a portion of the broadcast or multicast data punctured by the other type of communications in at least one of a subsequent portion of the time interval or a subsequent time interval based at least in part on the reassignment.

26. The mobile device of claim 25, wherein the broadcast or multicast data is received during a first downlink slot on the first portion of the system bandwidth and other broadcast or multicast data is received during a subsequent downlink slot on the first portion of the system bandwidth.

27. The mobile device of claim 25, wherein the indication of the set of resources allocated for downlink transmissions further identifies another set of resources allocated for uplink transmissions that is time division multiplexed with the set of resources allocated for downlink transmissions.

28. A network device for wireless communication, in a system comprising:
a processor;
memory coupled with the processor; and
instructions stored in the memory and operable, when executed by the processor, to cause the network device to:
transmit an indication of a set of resources allocated for downlink transmissions;
identify a first portion of a system bandwidth allocated for broadcast or multicast data transmissions on the set of resources from one or more base stations in a single frequency network (SFN), the first portion of the system bandwidth being frequency division multiplexed with a second portion of the system bandwidth allocated for mobile broadband (MBB) transmissions on the set of resources, the first portion of the system bandwidth and the second portion of the system bandwidth having different and incompatible numerologies with subcarrier spacing of the first portion of the system bandwidth and subcarrier spacing of the second portion of the system bandwidth being non-integer multiples of one another;
transmit broadcast or multicast data on the first portion of the system bandwidth on the set of resources as part of an SFN transmission based at least in part on the identifying;
identify a reassignment of a portion of the set of resources during a time interval for an other type of communications; and
transmit data associated with a portion of the broadcast or multicast data punctured by the other type of communications in at least one of a subsequent portion of the time interval or a subsequent time interval based at least in part on the reassignment.

29. The network device of claim 28, wherein the broadcast or multicast data is transmitted during a first downlink slot on the first portion of the system bandwidth and other broadcast or multicast data is transmitted during a subsequent downlink slot on the first portion of the system bandwidth.

30. The network device of claim 28, wherein the indication of the set of resources allocated for downlink transmissions further identifies another set of resources allocated for uplink transmissions that is time division multiplexed with the set of resources allocated for downlink transmissions.

* * * * *